United States Patent
Akahane et al.

(10) Patent No.: US 7,787,442 B2
(45) Date of Patent: Aug. 31, 2010

(54) COMMUNICATION STATISTIC INFORMATION COLLECTION APPARATUS

(75) Inventors: Shinichi Akahane, Hachioji (JP); Mitsuru Nagasaka, Kokubunji (JP); Kazuo Sugai, Hadano (JP); Yuichi Ishikawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 522 days.

(21) Appl. No.: 11/049,128

(22) Filed: Feb. 3, 2005

(65) Prior Publication Data

US 2005/0276230 A1    Dec. 15, 2005

(30) Foreign Application Priority Data

Jun. 15, 2004    (JP)    ............................ 2004-176535

(51) Int. Cl.
    H04L 12/66    (2006.01)
    H04L 12/28    (2006.01)
    H04L 12/56    (2006.01)
    G06F 15/173   (2006.01)
(52) U.S. Cl. .................. 370/352; 370/392; 709/224
(58) Field of Classification Search ................ 370/392
    See application file for complete search history.

(56) References Cited

U.S. PATENT DOCUMENTS

| 5,537,394 | A  | * | 7/1996  | Abe et al.       | 370/252 |
| 6,185,214 | B1 | * | 2/2001  | Schwartz et al.  | 370/401 |
| 6,473,400 | B1 | * | 10/2002 | Manning          | 370/229 |
| 6,873,600 | B1 | * | 3/2005  | Duffield et al.  | 370/252 |
| 6,920,112 | B1 | * | 7/2005  | McCloghrie et al.| 370/252 |
| 6,934,250 | B1 | * | 8/2005  | Kejriwal et al.  | 370/229 |
| 2002/0105915 | A1 | * | 8/2002 | Hamada         | 370/252 |
| 2002/0176370 | A1 | * | 11/2002| Ohba et al.    | 370/252 |

FOREIGN PATENT DOCUMENTS

| JP | 2001-257722 | 3/2000  |
| JP | 2002-016599 | 11/2000 |

OTHER PUBLICATIONS

"NetFlow Overview", Cisco Systems, Technical Marketing Internet Technologies Division, Feb. 2003, pp. 1-109.
Phaal, P., et al., "InMon Corporation's sFlow: A Method for Monitoring Traffic in Switched and Routed Networks", InMon Corp., Sep. 2001, pp. 1-26.
"NetFlow Export Datagram Format", NetFlow FlowCollector Installation and User Guide, Appendix B, pp. B-1-B-8.

* cited by examiner

*Primary Examiner*—William Trost, IV
*Assistant Examiner*—Andrew Chriss
(74) *Attorney, Agent, or Firm*—Stites & Harbison, PLLC; Juan Carlos A. Marquez, Esq.

(57) ABSTRACT

A communication statistic information collection apparatus comprises a unit for searching a flow table for a flow entry corresponding to a searching key, a unit for collecting statistics information for each of flows, a unit for generating a packet for notifying a collector apparatus of stored statistics information, a unit for updating the flow table in accordance with statistics control information shown by a statistics control entry found as a result of searching the flow table, and a unit for generating a sample packet to be transferred to the collect or apparatus at a specified sampling rate in accordance with the statistics control information shown by a specified entry found from the flow table.

2 Claims, 19 Drawing Sheets

FIG. 10

| FLOW ENTRY NUMBER | FLOW IDENTIFICATION CONDITIONS | | | | | |
|---|---|---|---|---|---|---|
| | SOURCE IP ADDRESS | DESTINATION IP ADDRESS | HIGHER LAYER PROTOCOL | TOS | SOURCE PORT NUMBER | DESTINATION PORT NUMBER |
| f1 | IP-S1 | IP-T1 | TCP | TOS1 | SPRT1 | DPRT1 |
| f2 | IP-S1 | IP-T3 | TCP | TOS1 | SPRT1 | DPRT3 |
| (61) | (621) | (622) | (623) | (624) | (625) | (626) |

| FLOW ENTRY NUMBER | STATISTICS INFORMATION | | | | |
|---|---|---|---|---|---|
| | NUMBER OF PACKETS | NUMBER OF BYTES | INPUT LINE NUMBER | OUTPUT LINE NUMBER | OTHER INFORMATION |
| f1 | 10 | 2000 | C-R2 | C-T1 | ... |
| f2 | 20 | 2000 | C-R2 | C-T3 | ... |
| (61) | (721) | (722) | (723) | (724) | (729) |

(72)

PACKET DATA MANAGEMENT INFORMATION BLOCK 200

FIG. 21

FLOW TABLE 60

| FLOW ENTRY NUMBER | FLOW IDENTIFICATION CONDITIONS ||||||| |
|---|---|---|---|---|---|---|---|---|
| | SOURCE IP ADDRESS | DESTINATION IP ADDRESS | HIGHER LAYER PROTOCOL | TOS | SOURCE PORT NUMBER | DESTINATION PORT NUMBER | OTHER INFORMATION | |
| f1 | IP_S1 | IP_T1 | TCP | TOS1 | SPRT1 | DPRT1 | * | ～EN-1 |
| f2 | IP_S1 | IP_T3 | TCP | TOS1 | SPRT1 | DPRT3 | * | ～EN-2 |
| f12 | * | * | TCP | * | * | * | * | ～EN-x12 |
| ... | ... | ... | ... | ... | ... | ... | ... | |
| | 621 | 622 | 623 | 624 | 625 | 626 | 629 | |

62

| FLOW ENTRY NUMBER | STATISTICS CONTROL INFORMATION ||||||||| |
|---|---|---|---|---|---|---|---|---|---|---|
| | REGISTRATION FLAG | REGISTRATION RATE | STATISTICS COLLECTION FLAG | BANDWIDTH CALCULATION FLAG | SAMPLING FLAG | SAMPLING RATE | SAMPLE DETERMINATION FLAG | SAMPLING-START BANDWIDTH | SAMPLING-END BANDWIDTH | OTHER INFORMATION |
| f1 | 0 | - | 1 | 0 | 0 | 1/1 | 0 | - | - | ... |
| f2 | 0 | - | 1 | 0 | 0 | 1/1 | 0 | - | - | ... |
| f12 | 1 | 1/1 | 1 | 0 | 0 | 1/1 | 0 | - | - | ... |
| ... | ... | ... | ... | ... | ... | ... | ... | ... | ... | ... |
| | 631 | 632 | 633 | 634 | 635 | 636 | 637 | 638 | 639 | 640 |

STATISTICS INFORMATION TABLE 70

| FLOW ENTRY NUMBER | STATISTICS INFORMATION 72 | | | | | | |
|---|---|---|---|---|---|---|---|
| | NUMBER OF PACKETS | NUMBER OF BYTES | INPUT LINE NUMBER | OUTPUT LINE NUMBER | BAND-WIDTH | OTHER INFOR-MATION | |
| f1 | P1 | B1 | C_R2 | C_T1 | - | ... | ~SE-1 |
| f2 | P2 | B2 | C_R2 | C_T3 | - | ... | ~SE-2 |
| f12 | P12 | B12 | xxx | xxx | - | ... | ~SE-x12 |
| ⋮ | ⋮ | ⋮ | ⋮ | ⋮ | ⋮ | ⋮ | |
| 61 | 721 | 722 | 723 | 724 | 725 | 729 | |

FIG. 23

SEARCHING RESULT NOTIFICATION 480

| 481 | 482 | 483 | 484 ENCAPSULATION HEADER INFORMATION | | | 485 |
|---|---|---|---|---|---|---|
| OUTPUT LINE NUMBER | COPY INDICATION FLAG | ENCAPSU-LATION INDICATION FLAG | LAYER 2 HEADER | LAYER 3 HEADER | LAYER 4 HEADER | OTHER INFOR-MATION |

FIG. 24

ADDRESS RELEASE CONTROL TABLE 280

| 281 BLOCK NUMBER | 282 NUMBER OF TIMES OF TRANSMISSION WAIT |
|---|---|
| BLOCK 1 | 0 |
| . . . | . . . |
| BLOCK k | 1 |
| BLOCK k+1 | 0 |
| BLOCK k+2 | 1 |
| BLOCK k+3 | 1 |
| . . . | . . . |
| BLOCK n | 0 |

FLOW MANAGEMENT TABLE 49

| FLOW ENTRY NUMBER 491 | FLOW TABLE ENTRY ADDRESS 492 | NUMBER OF PACKETS 493 | LAST UPDATING TIME 494 | NUMBER OF TIMES OF NO UPDATING 495 |
|---|---|---|---|---|
| f1 | 1 | P1' | 100 | 0 |
| f2 | 2 | P2' | 200 | 1 |
| ⋮ | ⋮ | ⋮ | ⋮ | ⋮ |

FIG. 27

FLOW TABLE 60

| FLOW ENTRY NUMBER | FLOW IDENTIFICATION CONDITIONS ||||||||
|---|---|---|---|---|---|---|---|---|
| | SOURCE IP ADDRESS | DESTINATION IP ADDRESS | HIGHER LAYER PROTOCOL | TOS | SOURCE PORT NUMBER | DESTINATION PORT NUMBER | SYN FLAG | OTHER INFORMATION |
| f24 | * | * | TCP | * | * | * | 1 | * |
| ... | ... | ... | ... | ... | ... | ... | ... | ... |
| | 621 | 622 | 623 | 624 | 625 | 626 | 627 | 629 |

EN-x24

62

| FLOW ENTRY NUMBER | STATISTICS CONTROL INFORMATION ||||||||||
|---|---|---|---|---|---|---|---|---|---|---|
| | REGISTRA-TION FLAG | REGISTRA-TION RATE | STATISTICS COLLECTION FLAG | BANDWIDTH CALCULA-TION FLAG | SAMPLING FLAG | SAMPLING RATE | SAMPLE DETERMINA-TION FLAG | SAMPLING-START BANDWIDTH | SAMPLING-END BANDWIDTH | OTHER IN-FORMATION |
| f24 | 0 | - | 1 | 1 | 0 | 1/10 | 1 | 50Mbps | 40Mbps | ... |
| ... | ... | ... | ... | ... | ... | ... | ... | ... | ... | ... |
| | 631 | 632 | 633 | 634 | 635 | 636 | 637 | 638 | 639 | 640 |

STATISTICS INFORMATION TABLE 70

| FLOW ENTRY NUMBER | STATISTICS INFORMATION 72 | | | | | | |
|---|---|---|---|---|---|---|---|
| | NUMBER OF PACKETS | NUMBER OF BYTES | INPUT LINE NUMBER | OUTPUT LINE NUMBER | BAND-WIDTH | OTHER INFOR-MATION | |
| f24 | P24 | B24 | xxx | xxx | 10 Mbps | · · · | ~ SE-x24 |
| ⋮ | ⋮ | ⋮ | ⋮ | ⋮ | ⋮ | ⋮ | |
| 61 | 721 | 722 | 723 | 724 | 725 | 729 | |

COMMUNICATION STATISTIC INFORMATION COLLECTION APPARATUS

CLAIM OF PRIORITY

The present application claims priority from Japanese application serial No. P2004-176535, filed on Jun. 15, 2004, the content of which is hereby incorporated by reference into this application.

BACKGROUND OF THE INVENTION (1) Field of the Invention

The present invention relates to a communication statistic information collection apparatus and, more particularly, to a communication statistic information collection apparatus to be connected as a node apparatus to a communication network to collect statistics information, such as the number of packets and the number of bytes, individually for each of packet flows.

(2) Description of the Related Art

The Internet has established its position as an important social infrastructure and begun to be applied not only to conventional Best-Effort based data communication but also to data communication which requires quality assurance of communication of data including real time data such as voice or video data and transaction data for basic industries. As broader bandwidths are used for access lines based on ADSL (Asymmetric Digital Subscriber Line) and FTTH (Fiber To The Home) technologies, an amount of data communication also tends to increase.

Against this backdrop, communication services enterprises such as carriers and ISPs (Internet Service Providers) require a network monitoring function for collecting and analyzing statistics information such as an amount of data communication to recognize the state of communication over a network. In particular, there is a great demand for the advanced function of collecting and analyzing statistics information individually for each group of communication data (hereinafter referred to as a flow) which is classified according to the source and destination of data, an application, quality level, and the like.

The use of such flow-by-flow statistics information allows the carriers and the ISPs to check the state of quality assurance of communication at the time of providing a quality-assured communication service. In addition, it also allows traffic engineering (hereinafter abbreviated as TE) which responds to an increase in the amount of data by effectively using limited network resources. It further allows provisioning which systematically prepares network resources by estimating customer demands and promptly provides the network resources in response to requests from users for communication bands, services, and the like, the detection and analysis of an attack to network resources from an unauthorized user, billing, and the like. The statistic information collecting function is normally provided in a communication node apparatus, which controls packet transfer over a network, such as a router, a switch, or the like.

As a method for collecting flow statistics information, a cache-type flow statistics technology described in, e.g., a publication entitled "NetFlow Overview"., Cisco Systems, Technical Marketing Internet Technologies Division, February 2003PP 1-109 (Non-Patent Document 1) has been known. A statistic information collection system using the above conventional technology is comprised of a plurality of statistic information collection apparatus arranged in distributed relation over a network and a collector apparatus which analyzes traffic over the entire network based on statistics information reported periodically from these statistic information collection apparatus.

The router having the cache-type statistic information collecting function is provided with a flow table for identifying a flow to which a received packet belongs and searches, every time a packet is received, the flow table by using a searching key composed of a combination of the header information items of the received packet, the input line interface number of the packet, and the like. The flow table is composed of a plurality of flow entries prepared for individual flows. Each of the flow entries defines a flow identification condition by a combination of, e.g., a source IP address, a destination IP address, a protocol type, aTOS (Type of Service) value, a source TCP (Transmission Control Protocol)/UDP (User Datagram Protocol) port number, a destination TCP/UDP port number, an input line interface number, and the like.

When the received packet matches any of the flow identification conditions registered in the flow table, statistics data such as the number of packets and the number of bytes is updated in the statistics information entry prepared in association with the flow identification condition. When the received packet does not match any of the flow identification conditions on the flow table as a result of searching the flow table, a new flow entry including, as the flow identification condition, the combination of the header information items, the input interface number, and the like serving as the searching key is added to the flow table. The contents of the statistics information entries are periodically monitored and the contents of the statistics information entry in which, e.g., the statistics data has remained unchanged for a certain time or longer are transmitted as statistics information data to the collector apparatus. The statistics information entry that has already been reported to the collector apparatus and the flow entry corresponding thereto are deleted from the table by an aging process.

As another method for collecting the flow statistics information, a sampling-type flow statistics technology described in, e.g., RFC3176 (Non-Patent Document 2) of Internet Engineering Task Force (IETF) has been known. In a sampling-type statistic information collection system, each router selectively transfers a copy of a received packet to a collector apparatus where a flow is identified from the copy packet and collection and analysis of statistics information are performed.

Each of the routers composing the sampling-type statistic information collection system samples the received packets in accordance with a sampling rate set preliminarily by a network administrator and transfers the copies (copy packets) of the received packets that have been sampled to the collector apparatus in a prescribed encapsulation format. There are also cases where each of the encapsulated packets includes additional information for flow identification such as, e.g., the input line interface number of the received packet, an output line interface number specified from the header information of the received packet, and the IP address (Next Hop IP address) of the router to be the next transfer destination. The collector apparatus extracts the copy packet from the encapsulated packet transferred from the router, identifies the flow based on the header information of the copy packet and information for flow identification added as required, and updates the flow-by-flow statistics information.

In the conventional cache-type statistic information collection system mentioned above, the combination of the flow identification condition and the information factors used for the searching key are roughly fixed so that each of the routers collecting the statistics information uniformly collects the flow-by-flow statistics information individually for each of the received packets. This leads to the problem of increasing the number of flow entries registered in the flow table and the number of statistics information entries.

In general, flow identification condition information necessary for flow identification accounts for about 200 to 600 bits. As a method for searching the table at a high speed by using such multi-bit information as the searching key, there is a searching method using a CAM (Content Addressable Memory). The CAM method enables high-speed matching of a bit pattern indicative of the flow identification condition registered in the memory with a bit pattern given as the searching key. However, since the CAM is higher in per-bit cost than a normal semiconductor memory, the problem is encountered that, when the number of flow entries in each of the routers is increased as in the conventional cache-type statistic information collection system, numerous CAM chips are required to constitute the flow table and router cost becomes high.

Moreover, because the conventional cache-type statistic information collection system can use only the roughly fixed combination of header information items as the flow identification condition, it becomes difficult to use information factors other than the information items described above, e.g., a TCP flag for identifying a control packet type in a TCP connection, a destination MAC (Media Access Control) address and a source MAC address in an Ethernet header, a VLAV (Virtual LAN) identifier for identifying a virtual LAN, and the like for flow identification.

In the sampling-type statistic information collection system, on the other hand, flow identification is performed at the collector apparatus so that flow classification using header information in a higher protocol layer, which is impossible with the cache type wherein flow identification is performed at the router, and the collection of statistics information based on the analysis of the content of packet data are enabled. In the sampling type, it can also be specified whether sampling for generating a copy packet should be performed for each of the input line interfaces of the received packets. This allows the enhancement of the accuracy of flow statistics by, e.g., limiting packets for which statistics information is to be collected to the packets received from a specified input line.

In the conventional sampling-type statistic information collection system, however, the accuracy enhancement of flow statistics at the collector apparatus is limited because it is impossible to specify whether sampling should be performed based on a unit other than the input line interface, e.g., based on a protocol type. According to the prior art technologies, it is also necessary for the network administrator to preliminarily set whether sampling should be performed, which leads to the problem that the setting of whether sampling should be performed cannot be changed dynamically depending on a traffic situation.

SUMMARY OF THE INVENTION

It is therefore an object of the present invention to provide a communication statistic information collection apparatus capable of individual collection of statistics information for each of packet flows through dynamic selection of a packet for which statistics information is to be collected.

Another object of the present invention is to provide a communication statistic information collection apparatus capable of flexible registration of a flow identification entry in a flow table for a packet flow having a preliminarily specified attribute.

Still another object of the present invention is to provide a communication statistic information collection apparatus capable of selective use of a cache-type statistic information collecting function or a sampling-type statistic information collecting function depending on a packet flow.

To attain the foregoing objects, a statistic information collection apparatus according to the present invention includes: a flow table composed of a plurality of flow entries each defining a flow identification condition for identifying a packet flow; a statistics function control table including, at least one statistics control entry defining, in association with a flow identification condition, statistics control information for limiting the packets for which the statistics information is to be collected; and a searching unit for searching, by using a combination of a plurality of header information items extracted from a header of each of the packets received over a network as a flow searching key, the flow table and the statistics function control table for an entry having the flow identification condition corresponding to the flow searching key, wherein the searching unit executes searching the flow table in accordance with the flow searching key generated from the header information of each of the received packets and searching the statistics function control table when there is no flow entry corresponding to the flow searching key, and collecting, when the statistics control entry corresponding to the flow searching key is found from the statistics function control table as a result of searching, the statistics information of a packet flow corresponding to the flow identification condition of the statistics control entry in accordance with the statistics control information shown by the statistics control entry.

One characteristic aspect of the present invention resides in that, when the statistics control entry is found as the entry corresponding to the flow searching key, the searching unit changes the contents of the flow table or the statistics function control table in accordance with the statistics control information shown by the statistics control entry.

Unlike a normal flow entry, the statistics control entry specifies, as the flow identification condition, a header information value of at least one of the plurality of header information items serving as the flow searching key which is to be provided in the packet for which the statistics information is collected. In a preferred embodiment of the present invention, the statistics function control table described above is combined with the flow table in order to search the table at higher-speed. In this case, when the flow entry corresponding to the flow searching key is not found, the statistics control information entry corresponding to the flow searching key can be found as a result of searching the flow table.

More specifically, the statistic information collection apparatus according to the present invention further includes a statistics information table composed of a plurality of statistics information entries for storing statistics information each of which is prepared in association with each of the entries in the flow table and the statistics function control table, wherein the searching unit includes a statistics information processing unit for updating the statistics information in response to packet reception in the statistics information entry corresponding to the flow entry or the statistics control entry found as a result of searching with the flow searching key.

One characteristic aspect of the present invention resides in that the statistics function control table (or the flow table) includes a first statistics control entry including, as a part of the statistics control information, a registration flag indicating to register a new flow entry to the flow table, and the statistic information collection apparatus further includes an entry management unit for adding a new entry to the flow table when the first statistics control entry is found as the entry corresponding to the flow searching key as a result of searching performed by the searching unit. The new flow entry includes the combination of the plurality of header information items extracted from the header of the received packets as the flow identification condition, so that the statistics information is individually collected for each of the packet flows specified by the flow searching key.

Another characteristic aspect of the present invention resides in that the statistic function control table (or the flow table) includes a second statistics control entry defining the statistics control information which indicates to generate a copy of each of the received packets in the packet flow corresponding to the flow identification condition at a specified sampling rate and, when the second statistics control entry is found as the entry corresponding to the flow searching key, the searching unit starts a control operation for generating the copy of the received packet corresponding to the flow identification condition and transferring the copy packet to a specified statistic information collection apparatus.

In an embodiment of the present invention, the second statistics control entry includes, as a part of the statistics control information, a condition for starting sampling to transfer a copy of the received packet generated at a specified sampling rate to a preliminarily specified statistics information collection apparatus and a sampling flag indicative of whether the sampling should be executed, and the searching unit comprises: a sampling determination unit for comparing, when the second statistics control entry is found as the entry corresponding to the flow searching key and the sampling flag is in an OFF state, the condition for starting the sampling with the statistics information shown by the statistics information entry corresponding to the second statistics control entry and changing the sampling flag to an ON state when the condition for starting the sampling is satisfied; and a sampling unit for issuing a control signal to generate the copy of the received packet at the specified sampling rate when the sampling flag is in the ON state.

In another embodiment of the present invention, the second control entry includes, as a part of the statistics control information, a condition for ending the sampling. In this case, when the second control entry is found as a result of searching the statistics function control table and the sampling flag is in the ON state, the sampling unit compares the condition for ending the sampling with the statistics information shown by the statistics information entry corresponding to the second control entry and returns the sampling flag to the OFF state when the condition for ending the sampling is satisfied. The conditions for starting and ending the sampling are specified by, e.g., a bandwidth value of the packet flow.

The communication statistic information collection apparatus according to the present invention comprises: a flow table searching unit for searching, by using a combination of a plurality of header information items extracted from a header of each of packets received from the network as a flow searching key, a flow table for a flow entry or a statistics control entry having a flow identification condition corresponding to the flow searching key; a statistics information processing unit for collecting statistics information individually for each of the packet flows in a statistics information entry corresponding to the entry found by the flow table searching unit; a statistics information notification packet generation unit for generating a packet for notifying a preliminarily specified statistic information collection apparatus of the statistics information stored in a statistics information table; and a copy generation unit for generating a copy of the received packet to be transferred to the preliminarily specified statistic information collection apparatus at a specified sampling rate in accordance with statistics control information shown by the specified flow entry found by the flow table searching unit as a result of searching.

One characteristic aspect of the communication statistic information collection apparatus according to the present invention resides in an entry management unit for adding, when the statistics control entry is found as the entry corresponding to the flow searching key as a result of searching performed by the flow table searching unit, a new flow entry having the contents of the flow searching key as the flow identification condition to the flow table in accordance with the statistics control information shown by the entry.

The statistics information is supplied to the statistics information notification packet generation unit by the entry management unit. In an embodiment of the present invention, the entry management unit monitors a state change in the statistics information table, detects one of the statistics information entries in which the statistics information has remained unchanged for a period longer than a specified time, reads out the statistics information shown by the statistics information entry and the flow identification condition corresponding to the statistics information entry from the statistics information table and the flow table, respectively, and supplies the statistics information and the flow identification condition to the statistics information notification packet generation unit. When adding the new flow entry to the flow table, the entry management unit selects a flow entry to be deleted from the flow table as required, reads out the flow identification condition shown by the selected flow entry and the statistics information shown by the statistics information entry corresponding to the selected flow entry from the flow table and the statistics information table, respectively, and supplies the flow identification condition and the read statistics information to the statistics information notification packet generation unit.

The present invention can designate the flow identification condition to be defined by each of the flow entries as a combination of, e.g., in addition to the header information items extracted from the IP header of each of the received packets, the header information items extracted from the layer 4 header such as a TCP header or a UDP header and from the layer 2 header such as an Ethernet header, and the input line number and output line number of each of the received packets.

In accordance with the present invention, the type of the packet flow for which statistics information is to be collected can be limited by using the statistics control information shown by the statistics control entries. This successfully suppresses an increase in the number of flow entries registered in the flow table. Accordingly, a small capacity is sufficient for a high-speed memory required by the flow table and the cost of the apparatus can be reduced.

In addition, the configuration of the present invention allows selective execution of cache-type statistic information collection and sampling-type statistic information collection by using the statistics control information of the statistics control entries. Further, it allows the specification of conditions for generating a copy packet to be transferred to the collector apparatus for the sampling-type statistic information collection. For example, by specifying the bandwidth value showing the condition for starting sampling as a part of the statistics control information in one of the statistics control entries using the attribute of a specified packet flow to be monitored as the flow identification condition, it becomes possible to start the sampling of the received packet at the time at which the bandwidth of the specified packet flow reaches the starting condition and start the transfer of the copy packet to the collector apparatus.

Since the population of samples to be transmitted to the collector apparatus can be limited in this case, the storage of the statistics information in the collector apparatus can be facilitated and the accuracy of analysis can be enhanced. This also enables automatic detection and analysis of a packet flow having a characteristic traffic pattern such as data on an attack to a specified server or virus data. This further enables effective use of the resources of the network and the collector apparatus.

BRIEF DESCRIPTION OF THE DRAWINGS

FIG. 10 is a view showing an example of a flow identification condition applied to the router R1 of FIG. 1;

FIG. 11 is a view showing an example of statistics information collected by the router R1 of FIG. 1;

FIG. 21 is a view showing an example of the flow table 60 of FIG. 16;

FIG. 22 is a view showing an example of the statistic information table 70 of FIG. 16;

FIG. 23 is a view showing an example of a searching result notification 480 outputted from the searching result output unit 48 of FIG. 20;

FIG. 24 is a view showing an example of the address release control table 280 provided in the copy management unit 28 of FIG. 16;

FIG. 27 is a view for illustrating another embodiment of the flow table 60 shown in FIG. 12; and FIG. 28 is a view for illustrating another embodiment of the statistic information table 70 shown in FIG. 12.

DETAILED DESCRIPTION OF THE PREFERRED EMBODIMENTS

Figure 1:
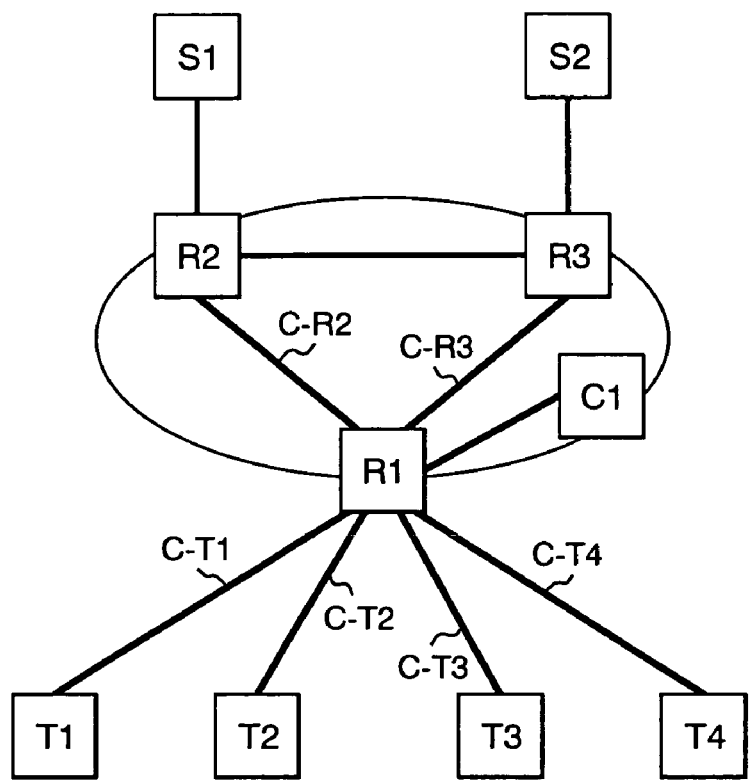
FIG. 1 is a view showing an example of a communication network to which a statistic information collection apparatus according to the present invention is applied.

Referring to the drawings, the embodiments of a communication statistic information collection apparatus according to the present invention will be described herein below.

FIG. 1 shows an example of a network structure to which the communication statistic information collection apparatus according to the present invention is applied.

A network shown here is comprised of: a router R1 accommodating terminals T1, T2, T3, and T4; a router R2 accommodating a server S1; a router R3 accommodating a server S2; and a collector apparatus C1 for collecting statistics information which is connected to the router R1. The router R1 has a function as the communication statistic information collection apparatus according to the present invention. The terminals T1, T2, T3, and T4 are connected to the router R1 via respective lines C-T1, C-T2, C-T3, and C-T4 and the router R1 is connected to the routers R2 and R3 via the respective lines C-R2 and C-R3.

In the network described above, it is assumed that the terminals T1 and T3 are in communication with the server S1, the terminals T2 and T4 are in communication with the server S2, the respective flows of IP (Internet Protocol) packets transmitted from the server S1 to the terminals T1 and T3 are referred to as "Flow 1" and "Flow 2", and the respective flows of IP packets transmitted from the server S2 to the terminals T2 and T4 are referred to as "Flow 3" and "Flow 4".

It is further assumed that the flow 1 is composed of a sequence of packets in each of which a higher layer IP protocol is TCP, TOS (Type of Service) in the IP header is TOS1, and a source port number and a destination port number in the TCP header are SPRT1 and DPRT1, respectively, the flow 2 is composed of a sequence of packets in each of which the higher layer IP protocol is TCP, TOS is TOS1, the source port number and the destination port number are SPRT1 and DPRT3, respectively, the flow 3 is composed of a sequence of packets in each of which the higher layer IP protocol is UDP, TOS is TOS2, the source port number and the destination port number in a UDP header are SPRT2 and DPRT2, respectively, and the flow 4 is composed of packets in each of which the higher layer IP protocol is UDP, TOS is TOS2, the source port number and the destination port number are SPRT2 and DPRT4, respectively.

Figure 2:
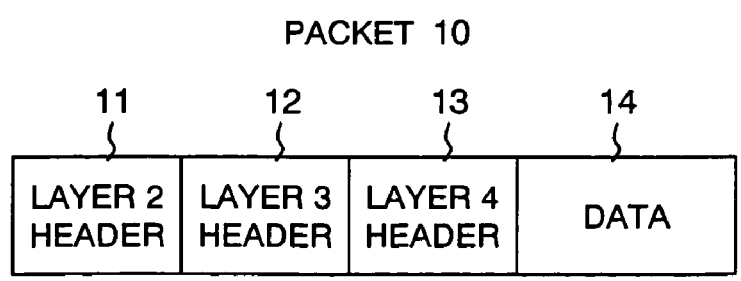
FIG. 2 is a view showing the format of a packet communicated over the communication network of FIG. 1.

FIG. 2 shows a structure of an IP packet 10 communicated over the network described above. The IP packet 10 is composed of a header in a plurality of layers compliant with the protocol layers of an OSI (Open System Interconnection) reference model and a data portion. Specifically, the IP packet 10 is composed of a layer 2 header 11, a layer 3 header 12, a layer 4 header 13, and data 14.

For a layer 2, a protocol such as, e.g., Ethernet, ATM (Asynchronous Transfer Mode), or MPLS (Multi-Protocol Label Switching) can be used. For a layer 3, a protocol such as, e.g., IP version 4 (IPv4) or IP version 6 (IPv6) can be used. For a layer 4, a protocol such as, e.g., TCP or UDP can be used.

Figure 3:
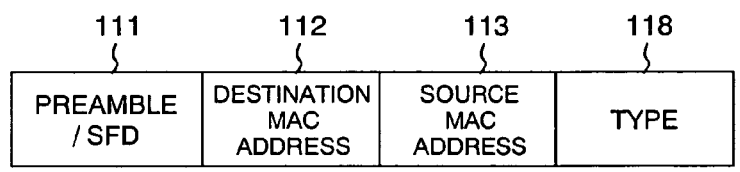
FIG. 3 is a view showing a header format for an Ethernet V2 frame.

FIG. 3 shows the header structure of an Ethernet V2 frame as an example of the layer 2 header 11. To the header of the Ethernet V2 frame, a preamble/SFD111 indicative of the beginning of a frame, a destination terminal address (destination MAC address) 112 and a transmitter address (source MAC address) 113 each in the layer 2, and a type 118 indicative of the protocol of the layer 3 are set.

Figure 4:
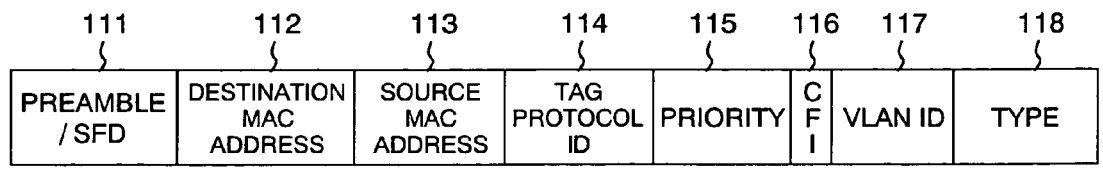
FIG. 4 is a view showing a header format for an Ethernet V2 frame compliant with Tag VLAN.

FIG. 4 shows the header structure of an Ethernet V2 frame compliant with Tag VLAN as another example of the layer 2 header 11. To the header of the Ethernet V2 frame compliant with Tag VLAN, the preamble/SFD 111 indicative of the beginning of the frame, the destination terminal address (destination MAC address) 112 and the transmitter address (source MAC address) 113 each in the layer 2, a TAG protocol ID 114 indicative of compliance with Tag VLAN, a priority 115 indicative the transfer priority of the frame, a CFI (Cannonical Field Indicator) 116 indicative of that routing information in the layer 2 is stored, a VLAN identifier (VLAN ID) 117, and a type 118 indicative of the protocol of the layer 3 are set.

Figure 5:
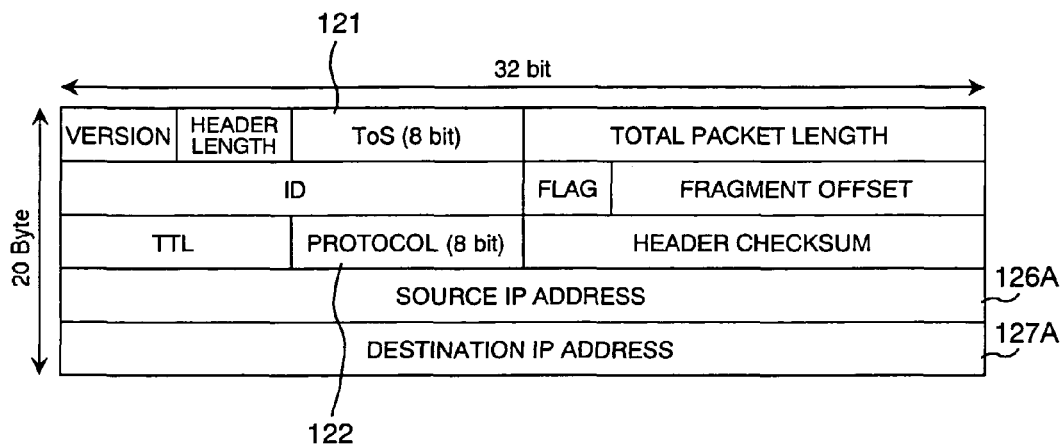
FIG. 5 is a view showing a header format for an IPv4 packet.

FIG. 5 shows an IPv4 header structure as an example of the layer 3 header 12. An IPv4 header includes a ToS 121 indicative of the quality of packet transfer, a protocol 122 indicative of the protocol of the layer 4, a source IP address 126A, a destination IP address 127A, and other information. Each of the ToS and the protocol is composed of 8 bits, while each of the source IP address and the destination IP address is composed of 32 bits.

Figure 6:
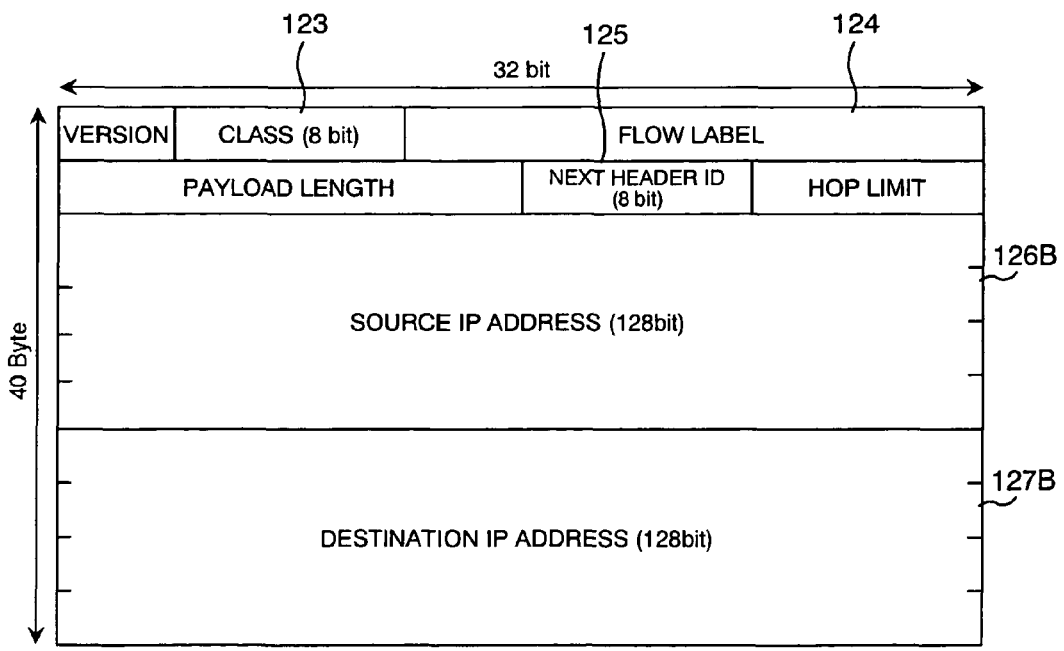
FIG. 6 is a view showing a header format for an IPv6 packet.

FIG. 6 shows an IPv6 header structure as another example of the layer 3 header 12. An IPv6 header includes a class 123 indicative of the quality of packet transfer, a next header number 125 indicative of the type of a next header subsequent to the IPv6 header portion, a source IP address 126B, a destination IP address 127B, and other information. When the next header is, e.g., a TCP or UDP header, a value indicative of the protocol of the layer 4 is set as the next header number 125. Each of the class 123 and the next header number is composed of 8 bits, while each of the source IP address and the destination IP address is composed of 128 bits.

Figure 7:
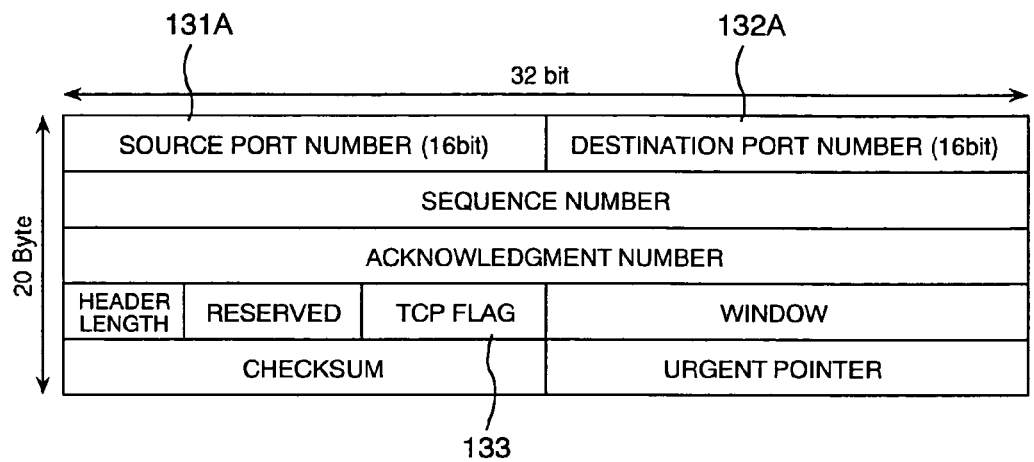
FIG. 7 is a view showing a TCP header format.

FIG. 7 shows a TCP header structure as an example of the layer 4 header 13. The TCP header includes, as logical port numbers for the identification of an application in the higher layer, a source port number 131A and a destination port number 132A each having a 16-bit length. In addition, a TCP flag 133 indicative of a packet type in a TCP connection and other information are also included in the TCP header.

Figure 8:
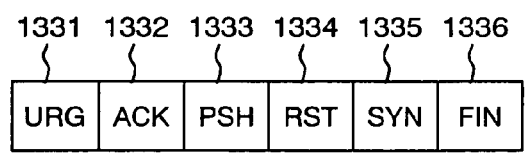
FIG. 8 is a view showing in detail the TCP flag 133 in FIG. 7.

As shown in FIG. 8, the TCP flag 133 is composed of six flags which are: an urgent flag (URG) 1331 indicating urgent passage of data received at a receiver terminal to an application; an ACK 1332 notifying a transmitter terminal of the reception of data at the receiver terminal; a PUSH 1333 indicating the passage of data without delay between the transmitter terminal and the receiver terminal; an RST 1334 indicating the resetting of a TCP connection; a FIN 1335 indicating the completion of a connection; and an SYN 1336 indicating the establishment of a connection.

Figure 9:
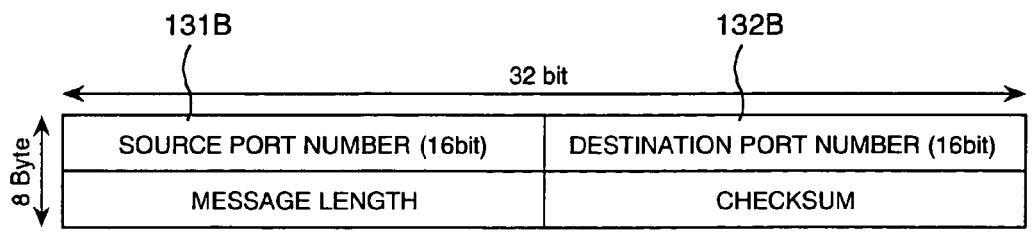
FIG. 9 is a view showing a format for a UDP header.

FIG. 9 shows an UDP header structure as another example of the layer 4 header 13. The UDP header includes a source port number 131B and a destination port number 132B each having a 16-bit length, similarly to the TCP header.

FIG. 10 shows a part of a flow table defining identification conditions for flows for which statistics information is to be collected in the router R1 of FIG. 1. In the flow table shown here, the flows for which statistic information is to be collected are limited to packet flows each using TCP as the protocol of the layer 4.

Each entry in the flow table shows a flow identification condition 62 and statistics control information not shown in association with a flow entry number 61. The flow identification condition 62 is defined by a source IP address 621, a destination IP address 622, a higher layer protocol 623, and a TOS 624 each shown by an IP header and by the respective values of the source port number 625 and the destination port number 626 included in a TCP or UDP header. The combination of the header information items shown here is only exemplary of the flow identification condition and the flow identification condition may also be a combination of header information items different from that shown in FIG. 10.

In the statistic information collection apparatus (router R1) according to the present invention, as will be described later, a searching unit 40 dynamically performs the registration and deletion of an entry in and from the flow table and partial correction of the contents of the entries. If the entries registered in the flow table are limited to those of TCP, it follows that the router R1 registers, out of the packet flows received from the lines C-R2 and CR-3, only the flows 1 and 2 in each of which the higher layer protocol is TCP.

FIG. 11 shows an example of statistic information collected in the statistics information table of the router R1. The statistics information table is composed of a plurality of statistics information entries corresponding to the flow entry number 61 of the flow table.

In the example shown here, the number of received packets in each of the flows (hereinafter referred to as the number of packets) 721, the cumulative number of bytes of the received packets (hereinafter referred to as the number of bytes) 722, the input line number 723 of the received packets, an output line number 724 as the transfer destination of the received packet, and other information 729 are collected as statistics information 72.

Figure 12:
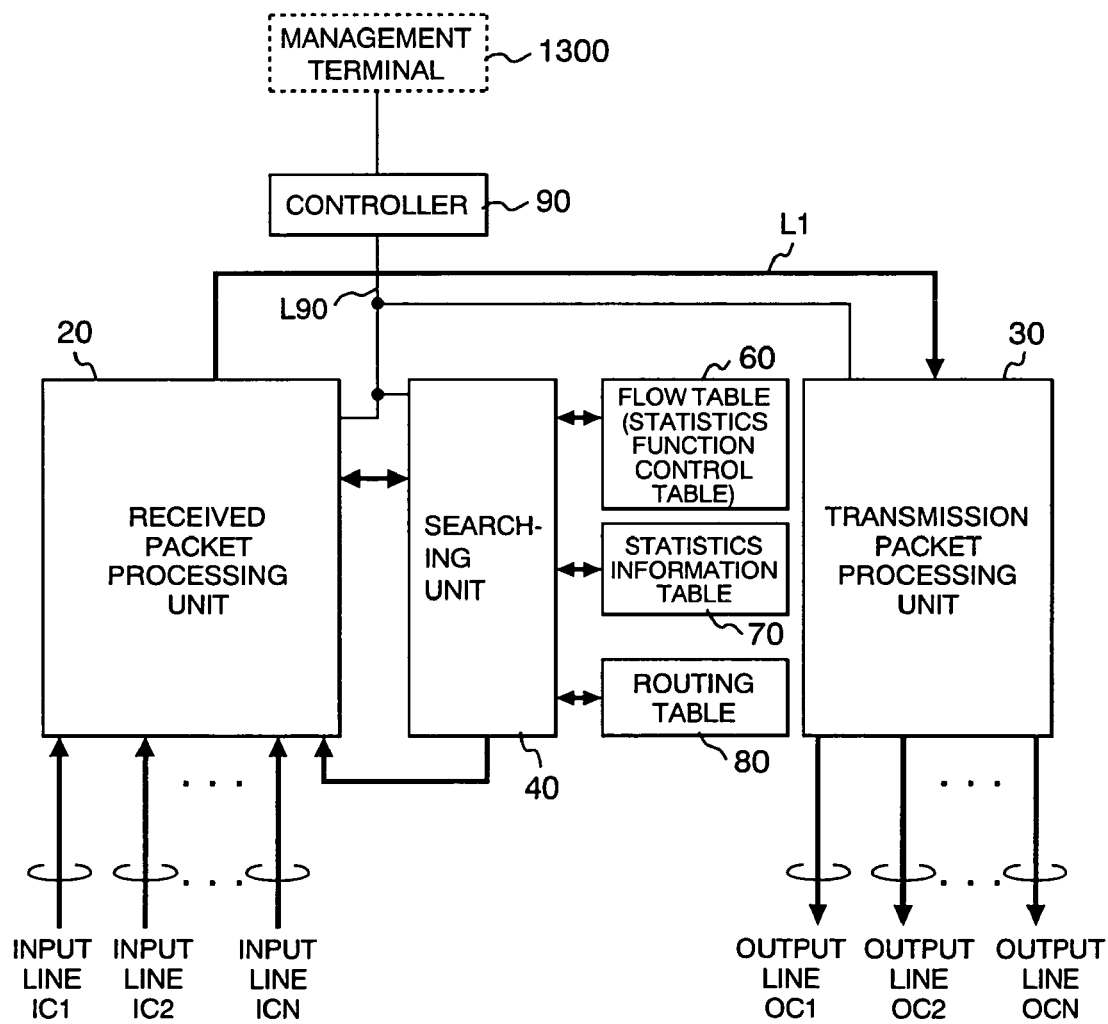
FIG. 12 is a structural view showing an embodiment of the router R1 having a statistic collecting function according to the present invention.

FIG. 12 is a block diagram showing an example of the router R1 having the statistic information collecting function according to the present invention.

The router R1 is comprised of: a received packet processing unit 20 connected to input lines ICn (n=1 to N); a transmission packet processing unit 30 connected to output lines OCn (n=1 to N); the searching unit 40 connected to the received packet processing unit 20; a flow table 60, a statistics information table 70 and a routing table 80, each of which is associated with the searching unit 40; and a controller 90. As will be described later, the flow table 60 serves also as a statistics function control table storing therein statistics control entries. The controller 90 is connected to a management terminal 1300 and sets various parametric information to the received packet processing unit 20, the searching unit 40, and the transmission packet processing unit 30 in response to an instruction from the management terminal 1300.

The router R1 may also have a structure in which the received packet processing unit 20, the transmission packet processing unit 30, the searching unit 40, and the controller 90 that have been described above are composed of individual dedicated LSIs and these dedicated LSIs are connected to each other, or a structure in which a plurality of processing units are implemented in a single dedicated LSI so that a smaller number of dedicated LSIs are connected to each other for a reduction in the number of wires between the LSIs. Instead of using dedicated LSIs, it is also possible to implement a part of the router function by using a general-purpose MPU (Micro Processing Unit) or an NP (Network Processor).

Although FIG. 12 shows a structure in which the received packet processing unit 20 and the transmission packet processing unit 30 are connected by a signal line L1, the apparatus may also be constructed such that each of the received packet processing unit 20 and the transmission packet processing unit 30 is composed of a plurality of units, and the received packet processing units and the transmission packet processing units are connected by a cross-bar switch. As a memory for the flow table 60 to be referred to by the searching unit 40, a CAM or an SSRAM, e.g., may be used appropriately when high-speed search performance is required or a DRAM which is low in per-bit cost and small in per-bit chip area can be used appropriately when relatively low-speed search performance satisfies the requirement.

Figure 13:
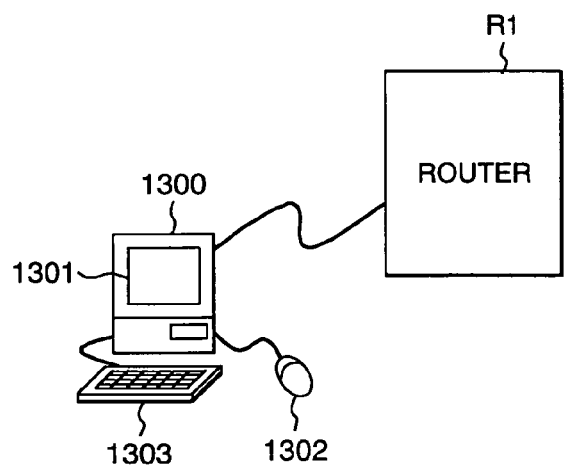
FIG. 13 is a view showing an example of the connecting relationship between the router R1 and the management terminal 1300 according to the present invention.

FIG. 13 shows an example of the management terminal 1300 connected to the controller 90 of the router R1. The management terminal 1300 is comprised of a display screen 1301 for displaying the contents of various tables in the router R1 and input means such as a mouse 1302 or a keyboard 1303 for selecting and editing an arbitrary portion of the contents of the table displayed on the display screen.

Figure 14:
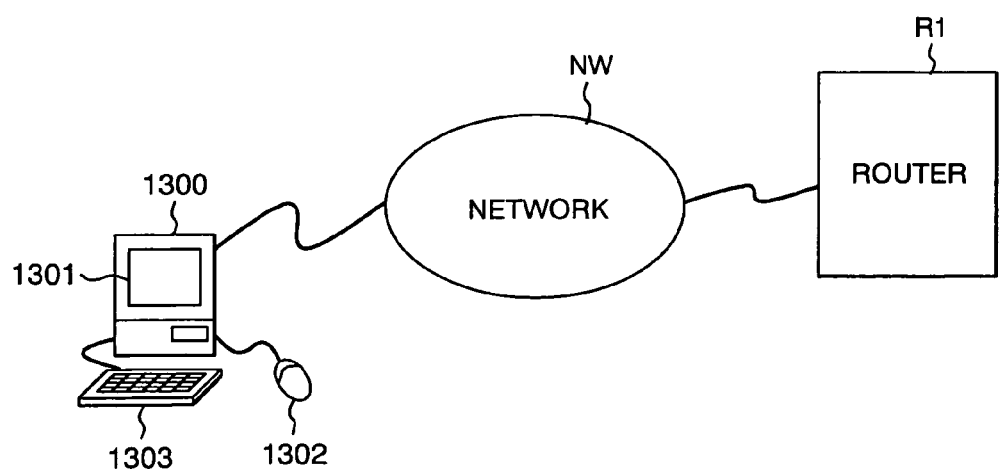
FIG. 14 is a view showing another example of the connecting relationship between the router R1 and the management terminal 1300 according to the present invention.

As shown in FIG. 14, the management terminal 1300 may also be connected to the router R1 via a network NW. Alternatively, it is also possible to impart the function of the management terminal 1330 to the collector apparatus C1 and update the information in the tables of the router from the collector apparatus.

Figure 15:
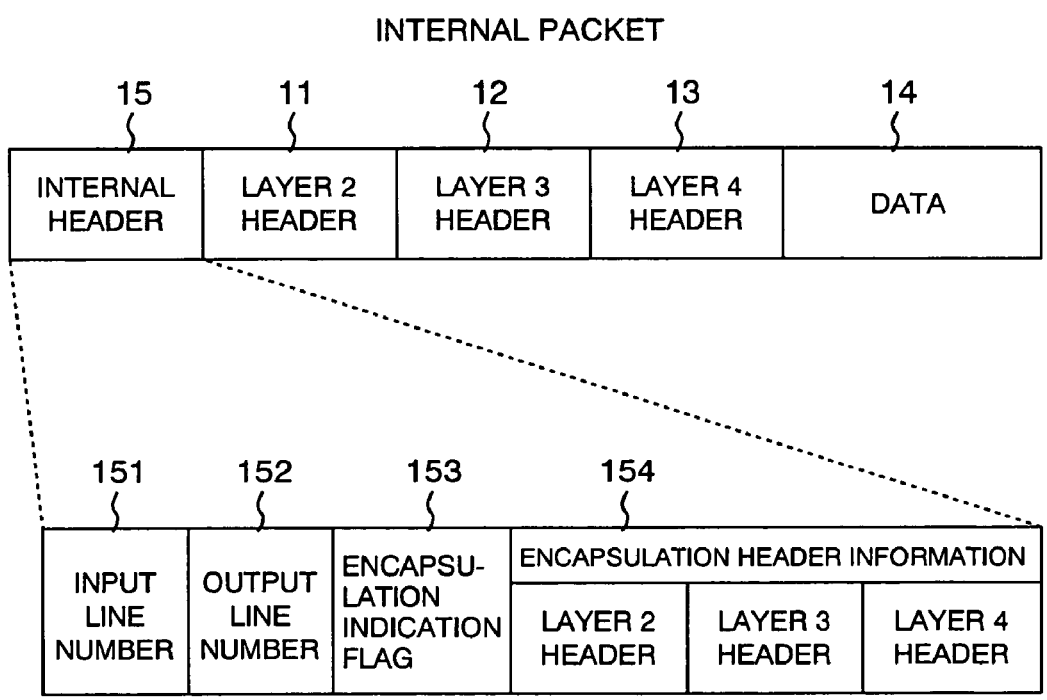
FIG. 15 is a view showing an example of a format for an internal packet processed in the router according to the present invention.

FIG. 15 shows an example of a format for an internal packet to be transferred in the router R1. The internal packet has a structure in which an internal header 15 is added to the head of a packet received from the network shown in FIG. 2. The internal header 15 includes an input line number 151 indicative of a line from which the packet is received, the output line number 152 indicative of an output line to which the packet should be output, an encapsulation indication flag 153, and encapsulation header information 154. The values of output line number 152, the encapsulation indication flag 153, and the encapsulation header information 154 are determined by the searching unit 40.

When a necessity occurs to transfer a copy of the received packet sampled at a specified rate to the collector apparatus C1, a flag bit is set to the encapsulation indication flag 153 for instructing encapsulation of the received packet from the searching unit 40 to the transmission packet processing unit 30. On the other hand, the contents of encapsulation headers (the layer 2 header, the layer 3 header, and the layer 4 header) required when the sampled received packet is transmitted to the collector apparatus C1 are set to the encapsulation header information 154. The contents of the encapsulation header information 154 are valid when the encapsulation indication flag 153 is in an ON state.

Figure 16:
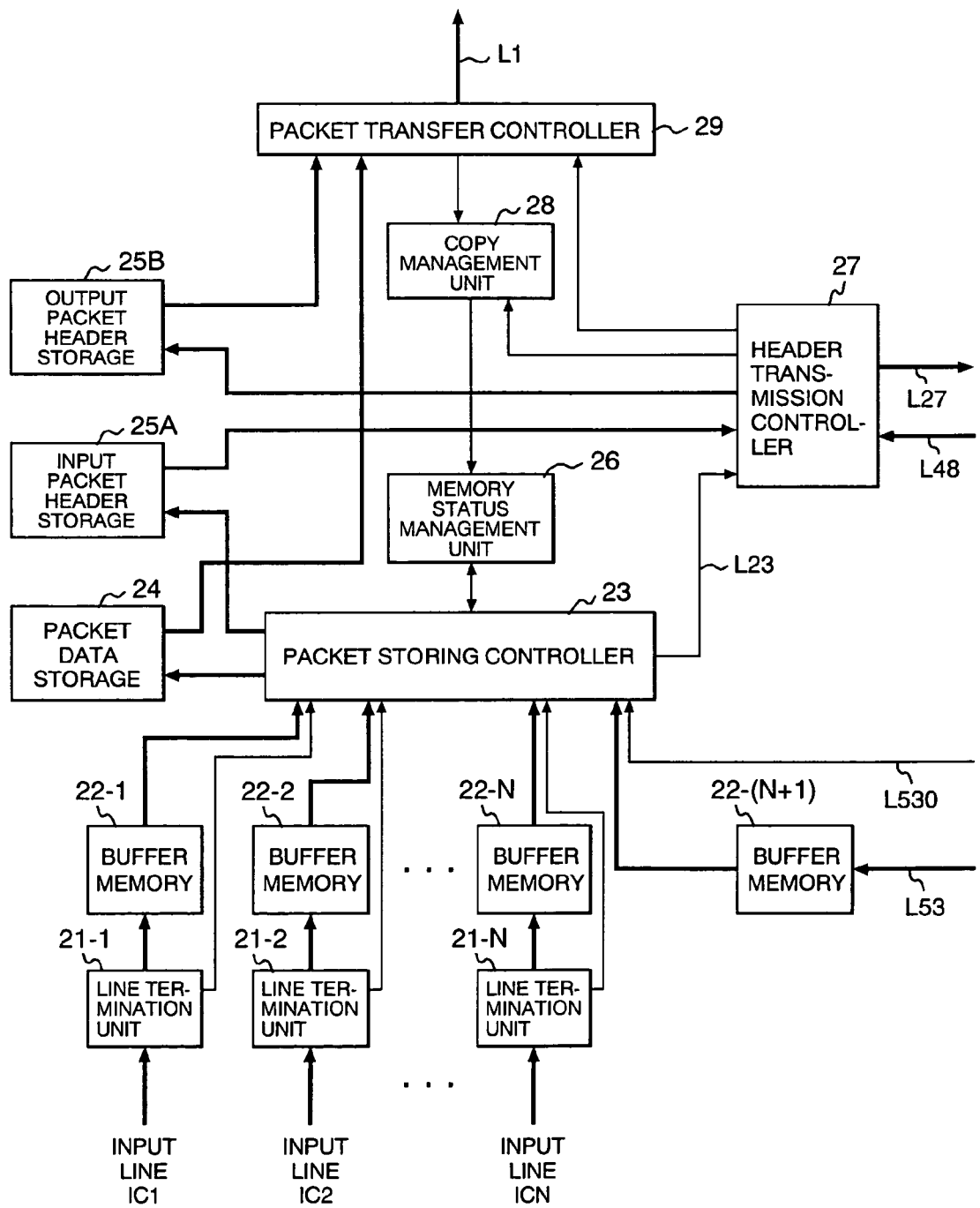
FIG. 16 is a block diagram showing an example of the received packet processing unit 20 of FIG. 12.

FIG. 16 shows an example of the received packet processing unit 20.

The received packet processing unit 20 is comprised of a plurality of line termination units 21-i (i=1 to N) each connected to the input line ICi, buffer memories 22-i (i=1 to N) for temporarily storing the received packets output from the line termination units 21-i, a buffer memory 22-(N+1) for temporarily storing a statistics information notification packet supplied from the searching unit 40, a packet storing controller 23 connected to these buffer memories, a packet data storage 24, an input packet header storage 25A, an output packet header storage 25B, a memory status management unit 26, a header transmission controller 27, a copy management unit 28, and a packet transfer controller 29.

Each of the line termination units 21-i performs, upon receiving a packet from the input line ICi, a packet termination process such as an error detection from the packet data. Each of the line termination units 21-i discards a received packet from which a data error was detected, while storing a normally received packet in one of the buffer memories 22-i and notifies the packet storing controller 23 of the packet reception. When a statistics information notification packet is stored in the buffer memory 22-(N+1), the packet storing controller 23 also receives the packet reception notification from the searching unit 40 via a signal line L530.

The packet storing controller 23 reads out the received packet from the buffer memory that has issued the packet reception notification in accordance with a predetermined selection rule and generates an internal header 15 to be added to the received packet. At this point of time, only the field of the input line number 151 in the internal header 15 includes valid data, while the other fields 152 to 154 are in empty states. The value k of the input line number 151 is determined uniquely from the one of the buffer memories 22-k (k=1 to N+1) from which the received packet has been read out.

The packet storing controller 23 stores a fixed-length header portion including the generated internal header 15 and the layer 2 header 11 to the layer 4 header 13 each extracted from the received packet into the input packet header storage 25A as a part of a packet data management information block 200, which will be described later by referring to FIG. 17. A variable-length data portion 14 which is the remaining portion of the received packet is stored in the packet data storage 24.

In the present embodiment, the packet data storage 24 has been divided into a plurality of fixed-length memory blocks, and the status (empty/use) of each of the memory blocks is managed by the memory status management unit 26. On reading out one received packet from the buffer memory, the packet storing controller 23 requests, from the memory status management unit 26, the allocation of the empty memory blocks corresponding in number to the data length of the received packet, and stores the data portion 14 of the received packet into these memory blocks in a form divided into a plurality of data blocks.

Figure 17:
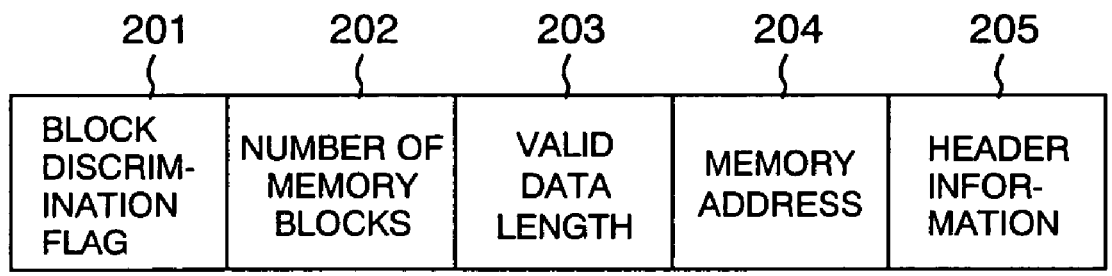
FIG. 17 is a view showing an example of a packet data management information block 200 stored in the memories 25A and 25B of FIG. 16.

FIG. 17 shows an example of the packet data management information block 200. The packet data management block 200 is prepared for successive reading out the data blocks from the plurality of memory blocks allocated to the same packet for the storage of the data portion, which is composed of a block discrimination flag 201, the number 202 of the memory blocks allocated to the same packet, a valid data length 203 indicative of the length of valid data stored in each of the memory blocks, a memory address 204, and a header information field 205.

The memory address 204 indicates the head address of each of the memory blocks in the packet data storage 24. To the header information field 205, the internal header 15 and headers 11 to 13 of the internal packet shown in FIG. 15 are set.

Figure 18:
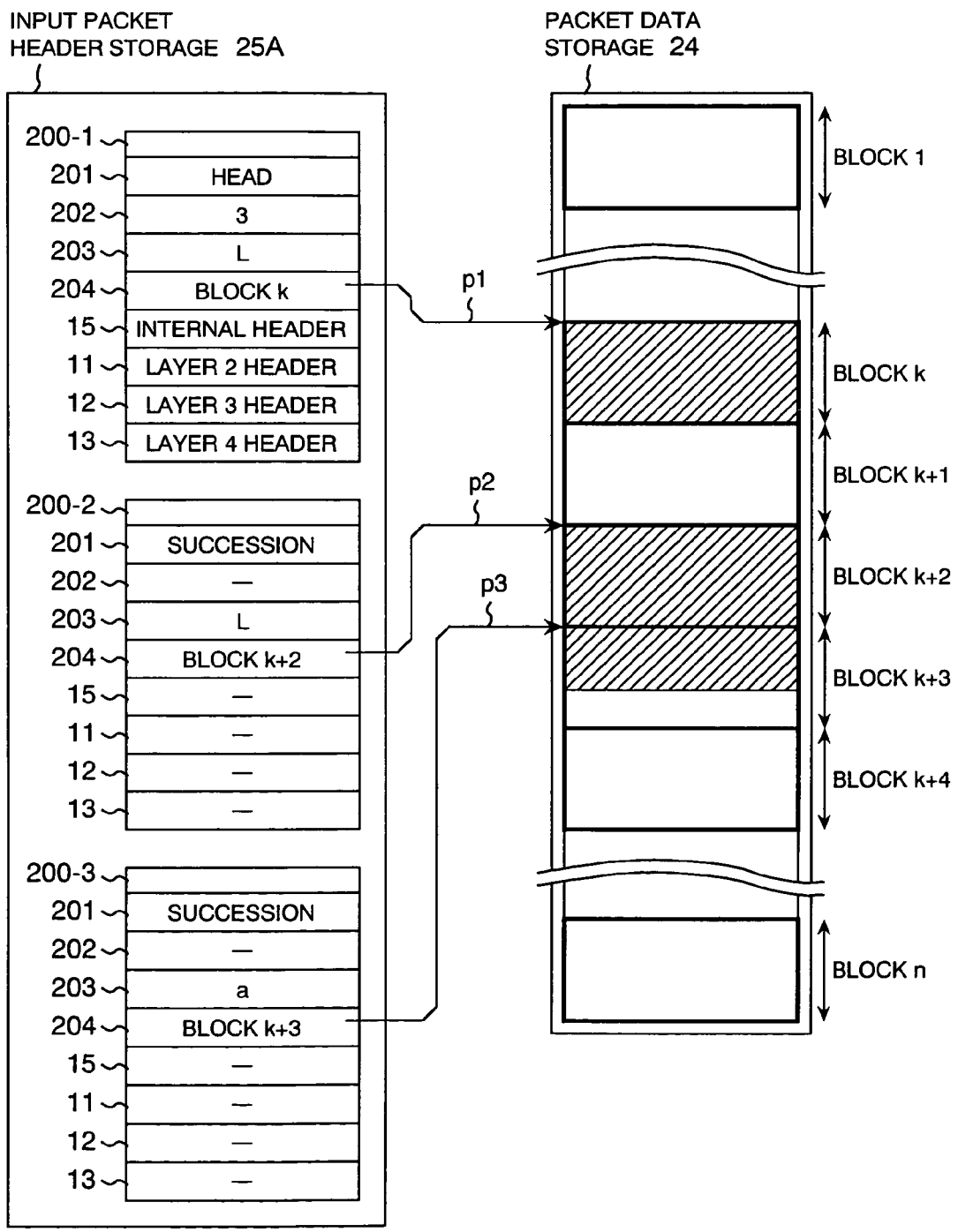
FIG. 18 is a view showing the relationship between the packet data management information block stored in the storage 25A (or 25B) of FIG. 16 and a data block stored in the memory 24.

As shown in FIG. 18, in the present embodiment, when a plurality of empty memory blocks, e.g., blocks k, (k+2), and (k+3) are allocated to one received packet, the packet storing controller 23 generates the packet data management information blocks 200-1 to 200-3 which are equal in number to the allocated memory blocks and stores these management information blocks into the input packet header storage 25A in the FIFO manner. The block discrimination flag 201 indicates whether the management information block 200 is the first one of the plurality of packet data management information blocks associated with the same packet.

FIG. 18 shows the case where the three memory blocks k, (k+2), and (k+3) are allocated on the assumption that the size of each of the memory blocks is L and the length of the data portion 14 of the received packet read out from one of the buffer memories 22-i is (2L+ΔL). In this case, a value indicative of the first block is set to the block discrimination flag 201 of the first packet data management information block 200-1 corresponding to the first memory block k, "3" is set to the number 202 of the memory blocks and "L" is set to the valid data length 203, while a pointer address value indicative of the head of the memory block k is set to the memory address 204, as indicated by the arrow P1.

To the header information field 205 of the first packet data management information block 200-1, the respective values of the internal header 15 and the layer 2 header 11 to the layer 4 header 13 are set. However, only the input line number 151 is valid in the internal header 15 and the respective values of the output line numbers 152 to the encapsulation header information 154 remain undetermined. As will be described later, these undetermined header information factors are determined for supplementation in accordance with the result of searching from the searching unit 40.

A value indicative of a following block is set to the block discrimination flag 201 of each of the second and third packet data management information blocks 200-2 and 200-3 corresponding to the second and third memory blocks (k+2) and (k+3), while the number 202 of the memory blocks and the header information field 205 thereof remain unused. To the valid data length 203 of the second packet data management information block 200-2, "L" is set, while a pointer address value indicative of the head of the memory block (k+2) is set to the memory address 204, as indicated by the arrow P2. On the other hand, "ΔL" is set to the valid data length 203 of the third packet data management information block 200-3, while a pointer address value indicative of the head of the memory block (k+3) is set to the memory address 204, as indicated by the arrow P3.

By thus storing the packet data management information blocks 200-1 to 200-3 in the FIFO manner in the input packet header storage 25A and specifying the number 204 of the memory blocks forming a group and the header information 205 to be added to the data portion 14 in the first management information block 200-1, it becomes possible to successively read out from the packet data management information blocks 200-1 to 200-3 in one group and sequentially read out data portion corresponding to one packet stored in a form divided into the plurality of blocks from the packet data storage 24 in accordance with the memory address 204 shown by each of the management information blocks. In addition, by using the header information 205 shown by the first management information block 200-1 as required, it becomes possible to encapsulate the received packet and transfer the encapsulated received packet to the collector apparatus C1. The operation of the received packet processing unit 20 will be described later in detail.

Figure 19:
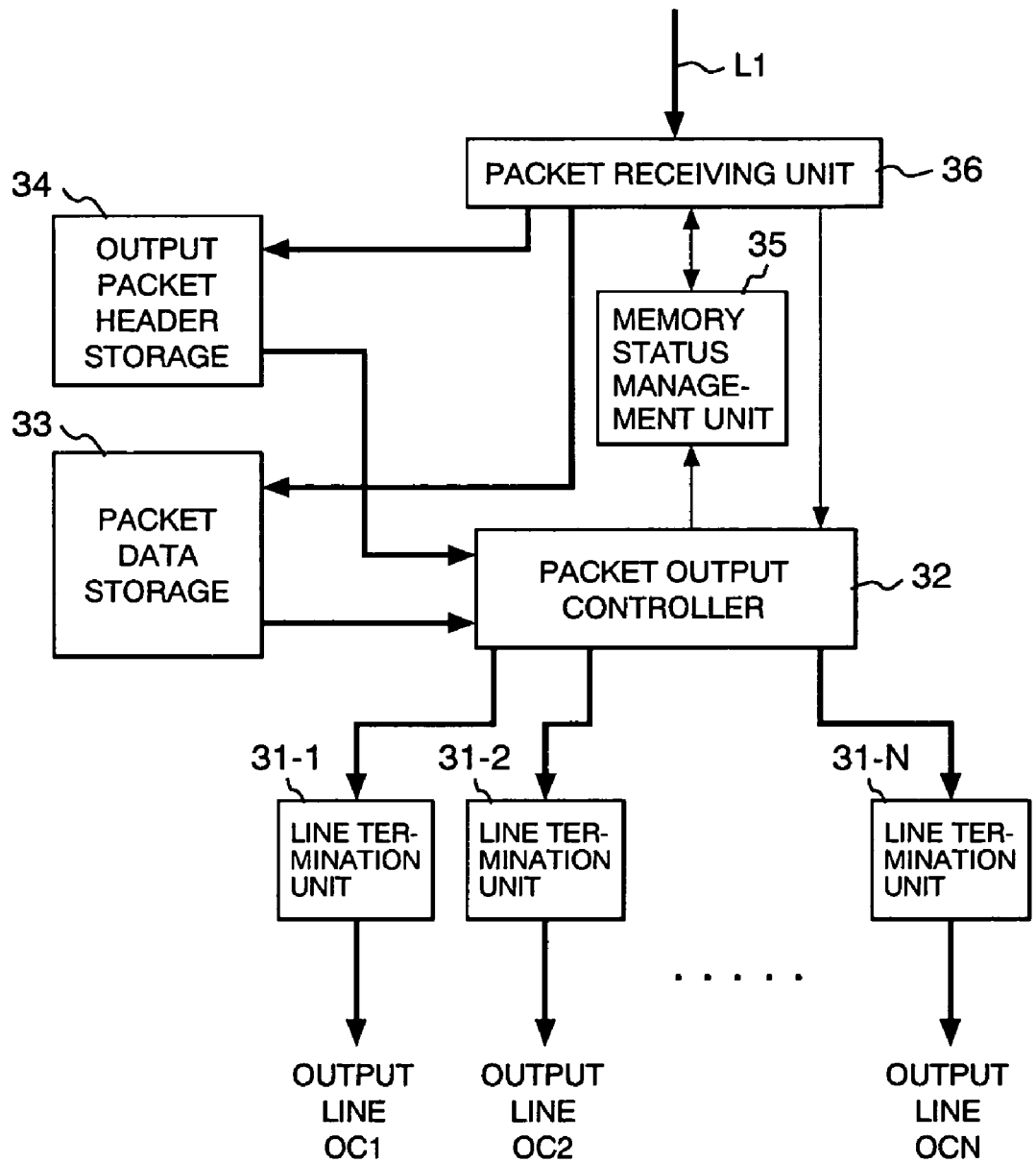
FIG. 19 is a block diagram showing an example of the transmission packet processing unit 30 of FIG. 16.

FIG. 19 shows an example of the transmission packet processing unit 30. The transmission packet processing unit 30 is comprised of a plurality of line termination units 31-i (i=1 to N) each connected to the output line OC, a packet output controller 32, a packet data storage 33, an output packet header storage 34, a memory status management unit 35, and a packet receiving unit 36. The operation of the transmission packet processing unit 30 will be described later in detail.

Figure 20:
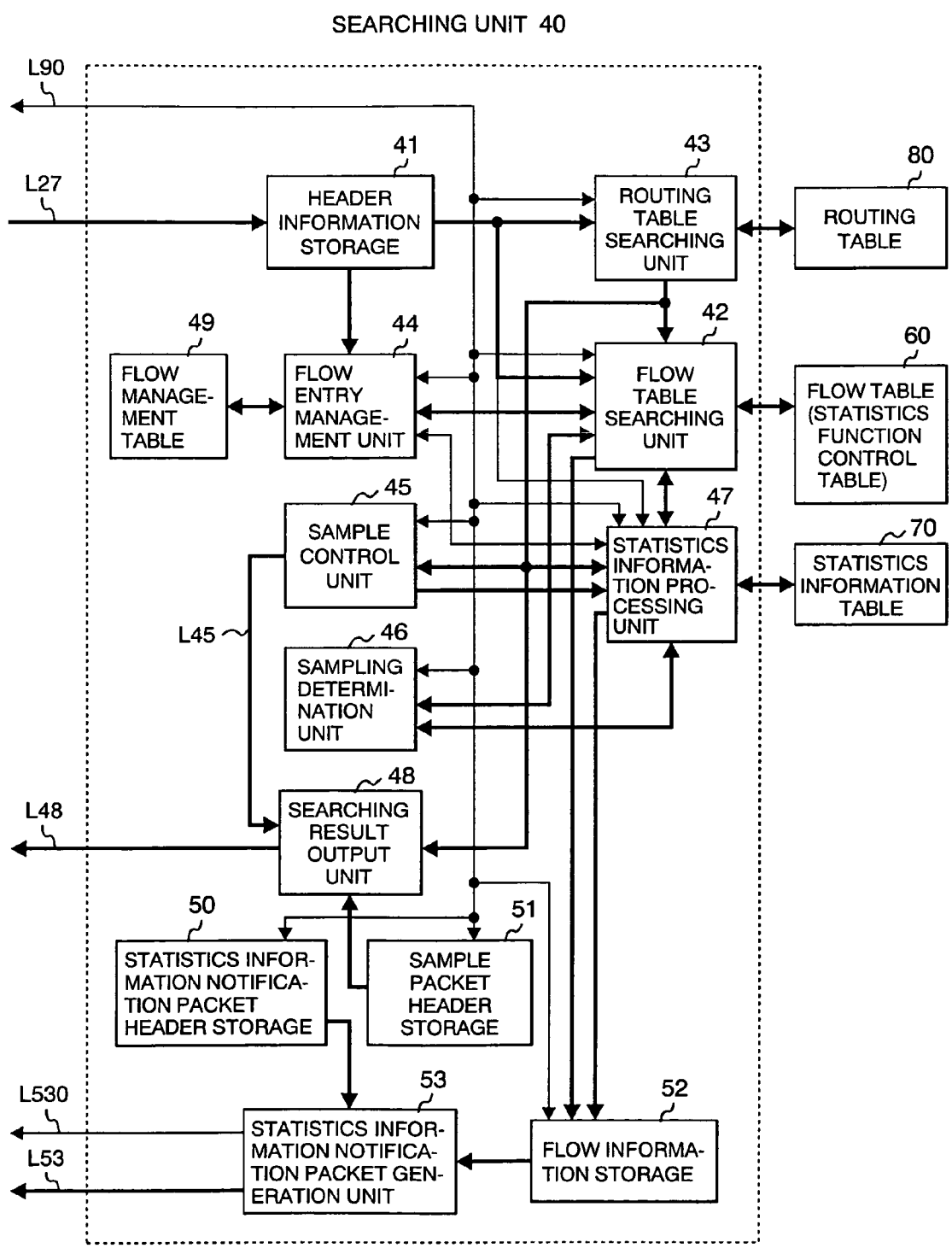
FIG. 20 is a block diagram showing an example of the searching unit 40 of FIG. 16.

FIG. 20 shows an example of the searching unit 40.

The searching unit 40 is comprised of a header information storage 41 connected to the header transmission controller 27 of the received packet processing unit via a signal line L27, a flow table searching unit 42, a routing table searching unit 43, a flow entry management unit 44, a sample control unit 45, a sampling determination unit 46, a statistics information processing unit 47, a searching result output unit 48 connected to the header transmission controller 27 via a signal line L48, a flow management table 49 associated with the flow entry management unit 44, a statistics information notification packet header storage 50, a sample packet header storage 51, a flow information storage 52, and a statistics information notification packet generation unit 53. Each of the flow table searching unit 42, the routing table searching unit 43, and the flow entry management unit 44 is connected to the header information storage 41.

The flow table searching unit 42 generates a searching key for the flow table 60 based on the header information outputted from the header information storage 41 and outputs statistics control information found as a result of searching the flow table 60 to the flow entry management unit 44 and to the sampling determination unit 46. The flow table searching unit 42 also performs the addition/deletion of a flow table entry in response to an instruction from the flow entry management unit 44 and outputs the contents of the deleted flow entry to the flow information storage 52.

The routing table searching unit 43 accesses the routing table 80 based on the destination IP address of the received packet that has been extracted from the header information shown by the header information storage 41 and notifies, of the routing information found as a result of searching the routing table 80, each of the flow table searching unit 42, the sample control unit 45, the statistics information processing unit 47, and the searching result output unit 48.

The statistics information processing unit 47 updates statistics data in the statistics information table 70 in response to the results of searching performed by the flow table searching unit 42 and the routing table searching unit 43. The statistics information processing unit 47 also reads out the statistics information stored in a specified entry in the statistics information table 70 in response to an instruction from the flow entry management unit 44 and outputs the statistics information to the flow information storage 52.

Upon receiving the result of searching the routing table 80 from the routing table searching unit 43, the searching result output unit 48 generates a searching result notification 480, which will be described later in detail by referring to FIG. 23, and transmits the searching result notification 480 to the header transmission controller 27 in the received packet processing unit 20 via the signal line L48.

The searching unit 40 shown in the present embodiment has a cache-type statistics data collecting function which transmits the statistics data stored in the statistics information table 70 by the statistics information processing unit 47 to the collector apparatus C1 with a specified timing and a sampling-type statistics data collecting function which generates a sample (copy packet) for a received packet belonging to a specified flow at a sampling rate specified by the flow table 60 and transmits the generated sample to the collector apparatus C1.

The sample control unit 45 notifies the received packet processing unit 20 to generate a sample when the statistics control information of a statistics control entry found as a result of searching the flow table (statistics function control table) indicates sampling (transfer of the copy packet to the collector apparatus). The information indicating the generation of a sample is sent to the received packet processing unit 20 in a form embedded in the searching result notification outputted from the searching result output unit 48 to the signal line L48. The encapsulation header information such as the destination IP address which is needed to transmit the sample to the collector apparatus C1 is read out from the sample packet header storage 51 and sent for notification to the received packet processing unit 20 as a part of the searching result notification.

As will be described later, the sampling determination unit 46 checks the statistics information in the flow to which the received packet belongs in accordance with the result of searching the flow table 60 and rewrites the sampling flag as a part of the statistics control information when a flow fell in a status in which the sampling should be started.

The statistics information notification packet generation unit 53 generates a statistics information notification packet based on the flow conditions and statistics information stored in the flow information storage 52 and on the encapsulation header information shown by the statistics information notification packet header storage 50 and outputs the generated statistics information notification packet to the buffer memory 22-C in the received packet processing unit 20 via the signal line L53. In the case where the destination of the statistics data notification and the destination of the transferred sample packet designate the identical collector apparatus, the same memory can be used for the statistics information notification packet header storage 50 and the sample packet header storage 51.

The setting of the encapsulation header information to each of the statistics information notification packet header storage 50 and the sample packet header storage 51 and the setting of entry information to each of the flow table 60 and the routing table 80 can be performed by a network administrator via a signal line L90 and the controller 90.

FIGS. 21 and 22 show respective examples of the specific contents of the flow table 60 and the statistics information table 70 provided in the router R1.

As shown in FIG. 21, the flow table 60 is composed of a plurality of entries each indicating the flow identification condition 62 and statistics control information 63 in association with the flow entry number 61. As shown in FIG. 22, the statistics information table 70 is composed of a plurality of entries each indicating the statistics information 72 in association with the flow entry number 61.

The flow entry number 61 is shown as information for associating the flow identification condition 62, the statistics control information 63, and the statistics information 72 with each other. Depending on the structure of the table, there may also be a case where the flow entry number 61 is not necessary. By using the flow entry number 61 as a pointer, it is also possible to associate a group of plural flow identification conditions defined in the flow table 60 with one statistics control information entry or one statistics information entry.

In the example shown here, other information 629 has been added as the flow identification condition 62 to the information items 621 to 626 shown in FIG. 10. As the other information 629, there can be used at least one of, e.g., the input/output line numbers of a packet, the destination/source MAC addresses and types shown in FIG. 3, the TAG protocol ID, the priority, and the VLAN-ID each shown in FIG. 4, and the TCP flags shown in FIG. 8.

From the flow table 60, there can be obtained a registration flag 631, a registration rate 632, a statistics collection flag 633, a bandwidth calculation flag 634, a sampling flag 635, a sampling rate 636, a sample determination flag 637, a sampling-start bandwidth 638, a sampling-end bandwidth 639, and other information 640 as a result of searching, as shown in the statistics control information 63. In the example shown here, a bandwidth 725 has been added as the statistics information 72 to the statistics information table 70 besides the information items 721 to 724 and 729 shown in FIG. 11.

In the flow table 60 shown in FIG. 21, the entries EN-1 and EN-2 having the flow entry numbers f1 and f2 define the respective flow identification conditions 62 and statistics control information 63 of the flow 1 and flow 2 each using TCP as the higher layer protocol shown in FIG. 10. When the header information of the received packet matches to the flow identification conditions of the entries EN-1 or EN-2, the searching unit 40 collects statistics information for the information items shown by the entries SE-1 or SE-2 in the statistics information table.

The entry EN-x12 having the entry number f12 is one of the statistics control entries. Unlike the other entries EN-1 and EN-2, the entry EN-x12 indicates that each of the other information items 621, 622, and 624 to 629 is arbitrary (indicated by "*") provided that the higher layer protocol 623 of the flow identification condition 62 is TCP.

In the statistics control entry EN-x12, the registration flag 631 of the statistics control information 63 is "1" and the registration rate is "1/1". When the statistics control information of the entry EN-x12 is outputted as a result of searching the flow table 60, the searching unit 40 executes the operation of registering a new flow entry in the flow table 60 in accordance with the registration flag 631 mentioned above. In other words, the statistics control entry EN-x12 functions as a flow registration entry for automatically adding a new flow entry matching the flow identification condition 62 to the flow table 60.

For example, when the router R1 received a packet belonging to the flow 1 in a state that the entries EN-1 and EN-2 are unregistered in the flow table 60, the flow table searching unit 42 outputs the statistics control information 63 of the entry EN-x12 as the result of searching the flow table 60 based on the header information of the received packet. As will be described later, the flow entry management unit 44 of the searching unit 40 has focused attention on the registration flag 631 of the statistics control information 63 output from the flow table searching unit 42 and instructs the flow table searching unit 42 to register a new flow entry EN-1 generated based on the header information shown by the header information storage 41 when the registration flag 631 is "1".

By setting the statistics control entry EN-x12 for flow registration to the flow table 60 in the initial state, a new flow entry for statistics information collection can be added automatically to the flow table 60 during the processing of a received packet satisfying the flow identification condition of the entry EN-x12. The entries EN-1 and EN-2 were added automatically to the flow table 60 by the statistic control entry EN-x12 mentioned above. In the state of FIG. 21, when the router R1 received a new TCP flow packet which does not satisfy the flow identification conditions of the entries EN-1 and EN-2, a different flow entry for statistic information collection is added to the flow table 60 in association with the received packet.

By determining an arrangement of the entries in the flow table 60 such that the flow entries EN-1 and EN-2 for statistic information collection are found preferentially to the statistics control entry EN-x12 as a result of searching, it becomes possible to circumvent the overlapping registration of a flow entry for statistic information collection of the same content in the flow table 60. It is also possible to register the statistics control entry EN-x12 in a statistics function control table different from the flow table 60 and search the statistics function control table when there is no entry corresponding to the searching key in the flow table 60.

Although the flow entry for statistic information collection is generated automatically in the flow entry management unit 44 in the embodiment of the present invention, it is also possible for the administrator to manually set some of the group of flow entries for statistics information collection other than the statistics function control entry from the management terminal 1300.

In the statistics control information 63 shown in FIG. 21, the registration rate 632 indicates the execution rate of the registration performed when the statistics control entry EX-x12 for flow registration is hit. The set value of the registration rate is valid when the set value of the registration flag 631 is "1". The set value "1/1" of the registration rate denotes that flow registration is performed inevitably when the statistics control entry EN-x12 is hit.

The statistics collection flag 633 indicates that the statistics information of the corresponding flow should be updated when the set value is "1". The bandwidth calculation flag 634 indicates that the bandwidth 725 of the corresponding flow is calculated when the set value is "1". In the example shown in FIG. 21, the statistics collection flag has been set to "1" and the bandwidth calculation flag 624 has been set to "0" in each of the entries EN-1 and EN-2 for statistic information collection and the statistics control entry EN-x12. Consequently, the bandwidth 725 has become an off-target item in terms of statistic information collection in the statistics information 72 shown in FIG. 22.

The sampling flag 635 indicates that, when the set value is "1", a copy of the received packet should be generated in accordance with the sampling rate 636 and transferred to the collector apparatus C1. The set value of the sampling rate 636 is valid when the set value of the sampling flag 635 is "1". When the set value of the sampling rate 636 is, e.g., "1/1000", it denotes the generation of copies at a rate of one copy to 1000 packets in the corresponding flow. In the example of FIG. 21, the sampling flag 635 of each of the flow entries EN-1, EN-2, and EN-x12 is "0" so that the value of the sampling rate 636 has no significance.

When the set value of the sample determination flag 637 is "1", the sampling determination unit 46 is instructed to execute a process of determining the start or end of sampling for the corresponding flow. When the set value is "0", the sample determination process is not executed. The sampling-start bandwidth 638 indicates the bandwidth value of the flow serving as a sampling start condition for the flow and the sampling-end bandwidth 639 indicates the bandwidth value of the flow serving as a sampling end condition.

When the sample determination flag 637 is "1", the sampling determination unit 46 compares a current bandwidth 725 shown by the corresponding statistics information entry with the sampling-start bandwidth 638 and changes the sampling flag 635 to "1" at the time at which the current bandwidth becomes larger than the sampling-start bandwidth. When the sampling flag 635 is in the "1" state, the sampling determination unit 46 compares the current bandwidth 725 with the sampling-end bandwidth 639 and returns the sampling flag 635 to "0" at the time at which the current bandwidth becomes smaller than the sampling-end bandwidth. In FIG. 21, the sample determination flag of each of the entries EN-1, EN-2, and EN-x12 has been set to "0" so that the generation of a copy through the sampling of the received packet is not performed.

The operation of the router according to the present invention will be described herein below by referring to FIGS. 16, 19, and 20. A description will be given first to the operation of the router when the packet storing controller 23 processes a received packet belonging to the flow 1 in the state that only the flow registration entry EN-x12 exists in the flow table 60 and the entries EN-1 and EN-2 for statistic information collection are not registered yet.

On reading out the received packet from one of the buffer memories 22-1 to 22-(N+1), the packet storing controller 23 generates the internal header 15 and requests, of the memory status management unit 26, the allocation of memory blocks required to store the data portion of the received packet by specifying the number of the required memory blocks. The memory status management unit 26 manages the use status of each of the plurality of memory blocks (memory addresses) prepared in the packet data storage 24 and allocates the required number of memory blocks (memory addresses) selected from among the memory blocks in empty states to the packet storing controller 23.

The packet storing controller 23 executes the wiring of the packet data management information blocks in the input packet header storage 25A and the writing of the data portion of the received packet in the packet data storage 24 in accordance with the memory addresses allocated by the memory status management unit 26, as described above with reference to FIG. 18. When the packet data storage 24 does not have the required number of empty memories, the packet storing controller 23 discards the received packet.

Although the description will be given in the present embodiment on the assumption that the wiring of the data management information blocks into the storage 25A is performed in the FIFO (Fast-In Fast-Out) manner, it is also possible to divide the input packet header storage 25A into a plurality of memory blocks each having a fixed length, impart each of the packet data management information blocks with the pointer address of the next block, and thereby store a set of packet data management information blocks in arbitrary empty memory blocks in the storage 25A in distributed relation.

The packet storing controller 23 transmits a packet reception notification to the header transmission controller 27 via the signal line L23 when the writing of the packet data management information blocks in the input packet header storage 25A is completed or when the writing of the packet data in the packet data storage 24 is completed.

Upon receiving the packet reception notification, the header transmission controller 27 reads out the first packet data management information block 200-1 from the input packet header storage 25A and transfers the header information (the internal header 15 and the layer 2 header 11 to the layer 4 header 13) shown by the first packet data management information block to the header information storage 41 of the searching unit 40 via the signal line L27. The header transmission controller 27 also reads out the following (M-1) packet data management information blocks 200-2, 200-3, . . . in succession based on the number (M) of memory blocks shown by the first packet data management information block 200-1 and temporarily holds the contents thereof.

In FIG. 20, the header information storage 41 of the searching unit 40 temporarily stores the header information received from the header transmission controller 27 via the signal line L27 and then distributes the header information to the flow table searching unit 42, the routing table searching unit 43, the flow entry management unit 44, and the statistics information processing unit 47.

The flow entry management unit 44 holds the header information and wait for the receiving of statistics control information from the flow table searching unit 42. The routing table searching unit 43 generates a searching key necessary for the searching of the routing table 80 from the header information and searches the routing table 80 for the routing information including the output line number. The result of searching is distributed to the flow table searching unit 42, the sample control unit 45, and the searching result output unit 48.

The flow table searching unit 42 extracts information items serving as the flow identification condition 62, i.e., the source IP address, the destination IP address, the higher layer protocol, the TOS, the source port number, the destination port number, and the other information from the header information and from the routing information outputted from the routing table searching unit 43 if necessary, and searches the flow table 60 by using the combination of these information items as the searching key.

Since it is assumed here such a state that the header information is of the received packet belonging to the flow 1 and only the flow entry EN-x12 has been registered in the flow table, the flow entry number (or entry address) f12 and the statistics control information in which the registration flag indicates "1", the registration rate indicates "1/1", the statistics collection flag indicates "1", and the sampling flag indicates "0" are obtained from the matched flow entry EN-x12 as a result of searching the flow table 60.

The flow table searching unit 42 distributes the searching result to the flow entry management unit 44, the sample control unit 45, the sampling determination unit 46, and the statistics information processing unit 47. In this case, since the sampling flag is "0", special operations for sample generation in the sample control unit 45 and the sampling determination unit 46 do not occur.

The statistics information processing unit 47 having received the header information from the header information storage 41 is waiting for the reception of the statistics control information from the flow table searching unit 42. In this example, the statistics collecting flag 633 shown by the statistics control information is "1" so that the statistics information processing unit 47 updates the statistics information 72 of the table entry SE-x12 having the flow entry number f12 in the statistics information table 70 based on the routing information received from the routing table searching unit 43 and the header information received from the header information storage 41. Specifically, in the table entry SE-x12, 1 is added to the number of packets 721, the length of the received packet shown by the header information is added to the number of bytes 722, the value of the input line number 151 shown by the header information is recorded in the input line number 723, and the output line number shown by the routing information is recorded in the output line number 724.

On the other hand, since the registration flag is "1" and the registration rate is "1/1" in the statistics control information received from the flow table searching unit 42, the flow entry management unit 44 judges that a new flow entry should be registered in the flow table 60 with regard to the flow having the header information received from the header information storage 41. If the registration rate is "1/k" (k is a value larger than 1), it is determined whether flow registration should be performed now in accordance with the registration rate.

The flow entry management unit 44 manages the use statuses of the entry addresses in the flow table 60. In the case exemplified here, the flow entry management unit 44 extracts information items serving as the flow identification condition from the header information to generate a new flow identification condition having the entry number f1 and gives a flow registration instruction to the flow table searching unit 42. The flow registration instruction includes the flow identification condition, partially corrected statistics control information, and empty entry addresses. If the flow table 60 does not have empty address required for the new flow entry, the flow entry management unit 44 issues the flow registration instruction mentioned above after performing a flow entry deleting process, which will be described later.

The flow table searching unit 42 having received the flow registration instruction from the flow entry management unit 44 adds a new flow entry to the flow table 60 in accordance with the entry address, the flow identification condition, and the statistics control information specified by the instruction. Since it is assumed here such a case that the packet belonging to the flow 1 was received, the entry EN-1 for statistic information collection is added to the flow table 60 in response to the flow registration instruction. In the case where a packet belonging to the flow 2 was received, the entry EN-2 for statistic information collection is added to the flow table 60 by the same operation as described above.

Upon receiving the routing information from the routing table searching unit 43, the searching result output unit 48 generates the searching result notification 480 and transmits it to the header transmission controller 27 in the received packet processing unit 20 via the signal line L48. As shown in FIG. 23, the searching result notification 480 is composed of an output line number 481, a copy indication flag 482, an encapsulation indication flag 483, a encapsulation header information 484, and other information 485.

The copy indication flag 482 is a flag for indicating whether the necessity to copy the received packet has occurred in the received packet processing unit 20, while the encapsulation indication flag 483 is a flag for indicating whether the copied packet should be encapsulated with the encapsulation header information 484. The copy indication flag 482 is set to "1" in the searching result notification generated when the sample control unit 45 outputs a copy indication signal to a signal line L45. As will be described later, the encapsulation indication flag 483 is set to "1" in a searching result notification which is generated for the transmission of a copy packet subsequently to the searching result notification in which the copy indication flag is set to "1". The header information read out from the sample packet header storage 51 is set to the encapsulation header information 484, which is valid only when the encapsulation indication flag 483 is "1".

In the case where a normal searching result notification is generated, the output line number extracted from the routing information received from the routing table searching unit 43 and the other information are set to the output line number 481 and the other information 485, respectively. In the searching result notification for the transmission of the copy packet, however, a specified output line number required to transmit the copy packet to the collector apparatus and the other information are set.

In the present example, there is no copying instruction from the sample control unit 45 so that the searching result output unit 48 generates the searching result notification 480 in which the copy indication flag 482 is "0", the encapsulation indication flag 483 is "0", the encapsulation header information 484 includes invalid data, and each of the output line number 491 and the other information 485 includes valid data and sends the generated searching result notification 480 to the signal line L48.

Referring again to FIG. 16, upon receiving the searching result notification 480 via the signal line L48, the header transmission controller 27 adds the respective contents of the output line number 481, the encapsulation indication flag 483, and the encapsulation header information 484, each shown by the searching result notification 480, as the output line number 152, the encapsulation indication flag 153, and the encapsulation header information 154 to the first packet data management information block 200-1 that has already been read out from the storage 25A. The updated packet data management information block 200-1 is written in the output packet header storage 25B. If necessary, it is also possible to add the other information 485 shown by the searching result notification 480 as a part of the internal header 15 of the packet data management information block 200-1.

As described by referring to FIG. 18, the header information need not be added to any of the succeeding packet data management information blocks 200-2, 200-3, and so on. Accordingly, the header transmission controller 27 writes the succeeding packet data management information blocks having been read out from the storage 25A into the output packet header storage 25B without any alteration.

Thereafter, the header transmission controller 27 notifies the copy management unit 28 of the value of the memory address 204 shown by each of the packet data management information blocks written in the output packet header storage 25B and the number of copies indicated by the searching result notification 480 and requests the start of packet transfer of the packet transfer controller 29. In this example, the copy flag 482 is "0" in the searching result notification 480 received from the searching unit 40 so that the header transmission controller 27 notifies the copy management unit 28 of "0" as the number of copies.

The copy management unit 28 controls the release of each of the memory blocks in the packet data storage 24 and includes, e.g., an address release control table 280 for storing therein the number of times 282 of transmission wait for the stored data in association with each of memory blocks (memory addresses) 281 in the packet data storage 24, as shown in FIG. 24.

Upon receiving the memory address 204 in the packet data storage 24 and the number of copies from the header transmission controller 27, the copy management unit 28 changes, in accordance with the number of copies n notified, the number of times of transmission wait 282 in a table entry corresponding to the memory address 204 in the address release control table 280. The number of times of transmission wait 282 is set to "1" when the number of copies notified from the header transmission controller 27 is "0", and set to "2" when the number of copies is "1".

The state of the table shown in FIG. 24 corresponds to the state shown in FIG. 18, in which the data portion of the received packet is divided into the three data blocks corresponding to the memory blocks k, (k+2), and (k+3). In this case, since the number of copies notified from the header transmission controller 27 is "0", "1" is set as the number of times of transmission wait 282 corresponding to the memory blocks k, (k+2), and (k+3).

Upon receiving a request to start packet transfer from the header transmission controller 27, the packet transfer controller 29 reads out the first packet data management information block 200-1 from the output packet header storage 25B and reads out the first data block from the memory block k of the packet data storage 24 in accordance with the memory address 204 and the valid data length 203 each shown by the packet data management information block. The packet transfer controller 29 reads out the second and third packet data management information blocks 200-2 and 200-3 from the output packet header storage 25B in the FIFO manner in accordance with the number 202 of memory blocks shown by the first packet data management information block 200-1 and successively reads out the succeeding data blocks from the memory blocks (k+2) and (k+3) of the packet data storage 24 in accordance with the memory address 204 and the valid data lengths 203 shown by each of packet data management information blocks.

The packet transfer controller 29 sends out, to the signal line L1, the header information 205 extracted from the first packet data management information block 200-1 and then sends out the packet data portion 14 reconstructed from these data blocks subsequently to the header information 205, thereby transferring an internal packet having the format of FIG. 15 to the transmission packet processing unit 30. When the transfer of one internal packet is completed, the packet transfer controller 29 outputs a packet transfer completion notification to the copy management unit 28. The packet transfer completion notification indicates the addresses of the memory blocks from which the reading out of data has been completed.

Upon receiving the packet transfer completion notification mentioned above, the copy management unit 28 decrements the value of the number of times 282 of transmission wait 282 in the address release control table 280 in accordance with the notified memory block address. In this example, the value of the number of times of transmission wait 282 of each of the memory blocks k, (k+2), and (k+3) is reduced by 1 and, eventually, each value becomes "0". The copy management unit 28 checks the remaining number of times every time the value of the number of times of transmission wait 282 is updated. For the memory block of which the number of times of transmission wait 282 becomes "0", it is judged that the preservation of the stored data is no more necessary, and the copy management unit 28 notifies the memory status management unit 26 to release the memory address. The memory status management unit 26 manages the memory addresses (memory blocks), for which the release instruction was issued, as empty memory addresses and uses these memory addresses for subsequent allocation to the packet storing controller 23.

In the transmission packet processing unit 30 shown in FIG. 19, upon receiving the internal packet from the signal line L1, the packet receiving unit 36 stores the header information portion (headers 15 and 11 to 13) in the output packet header storage 34 and stores the data portion 14 of the packet in the packet data storage 33. The storing of the header information and the packet data in these storages is performed in the same manner as in the input packet header storage 25A and packet data storage 24 of the received packet processing unit 20 by using the packet data management information blocks illustrated with reference to FIG. 18. The memory blocks for storing the packet data are allocated by the memory status management unit 35.

When writing the packet data management information blocks in the output packet header storage 34 and writing the packet data in the packet data storage 33 is completed, the packet receiving unit 36 outputs a packet transmission request to the packet output controller 32.

Upon receiving the packet transmission request, the packet output controller 32 reads out the succeeding packet data management information blocks from the number 202 of the memory blocks shown by the first packet data management information block read out from the output packet header storage 34, similarly to the packet transfer controller 29 of the received packet processing unit 20, and successively reads out the data portion of the packet from the packet data storage 33 in accordance with the memory address 204 and the valid data length 203 shown by each of the packet data management information blocks.

The packet output controller 32 reconstructs the data blocks read out from the plurality of memory blocks into an original packet data 14 and then determines whether the packet should be encapsulated based on the value of the encapsulation indication flag 153 shown by the first packet data management information block. In the present example, the value of the encapsulation indication flag mentioned above is "0" so that the output packet need not be encapsulated. Accordingly, the packet output controller 32 generates an output packet by imparting the layer 2 header 11, the layer 3 header 12, and the layer 4 header 13 each extracted from the first packet data management information block to the reconstructed packet data 14 and outputs the generated output packet to the line termination unit 31-k specified by the output line number 152 shown by the packet data management information block mentioned above.

The line termination unit 31-k imparts additional information such as a redundant code to the output packet received from the packet output controller 32 and transmits the output packet to the output line OCk.

A description will be given next to the operation of the router R1 in the case where the packet storing controller 23 processes a received packet belonging to the flow 1 in the state in which the flow entry EN-1 for statistic information collection has already been registered in the flow table 60.

The operation in this case is the same as in the case where the flow entry EN-1 is unregistered until the flow table searching unit 42 searches the flow table 60 in the searching unit 40 after the header transmission controller 27 transfers the header information of the received packet to the searching unit 40. This time, the flow entry EN-1 has already been registered in the flow table 60 so that the flow table searching unit 42 outputs the statistics control information shown by the flow entry EN-1 as a result of searching the flow table 60. As shown in FIG. 21, the statistics control information 63 of the flow entry EN-1 is such that the registration flag 631 is "0", the statistics collection flag 633 is "1", and each of the sampling flag 635 and the sampling determination flag 637 is "0".

Since the registration flag is "0", the flow registration by the flow entry management unit 44 is not performed. In addition, since each of the sampling flag and the sampling determination flag is "0", special operations by the sample control unit 45 and the sampling determination unit 46 do not occur.

On the other hand, the statistics collection flag is "1" so that the statistics information processing unit 47 updates the statistics information in the statistics information entry SE-1 with the flow entry number f1. Specifically, 1 is added to the number 721 of packets, the number of bytes of the received packet shown by the header information received from the header information storage 41 is added to the number 722 of bytes, the input line number shown by the header information is recorded in the input line number 723, and the output line number shown by the routing information received from the routing table searching unit 43 is recorded in the output line number 724. The operations of the searching result output unit 48 and the subsequent operation of the received packet processing unit 20 are the same as in the case described above where the flow entry EN-1 is unregistered.

A description will be given next to the operation of deleting an entry from the flow table that is performed by the flow entry management unit 44.

The flow entry management unit 44 monitors the state of packet reception with respect to flow entries selected as deletion targets in which the statistics collection flag is "1" and each of the registration flag, the sampling flag and the sampling determination flag is "0", and deletes from the flow table 60 a flow entry detected that packet reception has stopped for a specified time or longer. The flow entry management unit 44 also selects a specified one from among the entries as the deletion targets and deletes the selected entry from the flow table 60 when it is necessary to register a new flow entry in the flow table 60 in the state with no empty entry region.

The flow information of the entries to be the deletion target is registered in the flow management table 49 and the state of packet reception is periodically monitored. As shown in, e.g., FIG. 25, the flow management table 49 shows the flow entry number 49, an entry address 492 in the flow table 60, the number 493 of packets, a last updating time 494, and the number of times 495 of no updating for each of the entries as the deletion targets. The number 493 of packets is typical statistics information selected to monitor the communication state in the flow as the deletion target. Instead of the number of packets, the number of bytes may also be used as a target item of monitoring.

The flow entry management unit 44 reads out, for each packet flow having the flow entry number registered in the flow management table 49, the latest value of the number 721 of packets from the statistics information table 70 at specified time intervals via the statistics information processing unit 47 and compares the latest value with the previous number 493 of packets shown by the flow management table 49. If the latest number of packets is different from the previous value, the number 493 of packets is replaced with the latest value and the last updating time 494 is replaced with the current time. If the latest number of packets is the same as the previous value, the value of the number of times 495 of no updating is incremented without changing the last updating time 494. The number of times 495 of no updating may be returned to an initial value every time the number 493 of packets is updated.

The flow entry management unit 44 judges that the flow entry of which the number of times of no updating has reached a specified threshold value as a result of the increment is an unneeded entry, instructs the flow table searching unit 42 to delete the unneeded flow entry by specifying the entry address 492, and instructs the statistics information processing unit 47 to delete the statistics information entry by specifying the flow entry number.

When the reception of the statistics control information of the flow entry EN-x12 from the flow table searching unit 42 has caused the necessity to add a new flow entry to the flow table 60 and the flow table does not have an empty region, the flow entry management unit 44 selects, from the flow management table 49, an entry the last updating time 494 of which is oldest as the unneeded flow entry and gives an instruction to perform the same entry deletion as described above to each of the flow table searching unit 42 and the statistics information processing unit 47.

Upon receiving the delete instruction from the flow entry management unit 44, the flow table searching unit 42 reads out the flow identification condition 62 from the specified entry address in the flow table 60. After transferring the read flow identification condition to the flow information storage 52, the flow table searching unit 42 deletes the flow entry and notifies the flow entry management unit 44 of the release of the address of the deleted entry. Likewise, the statistics information processing unit 47 also reads out the contents of the statistics information entry having the specified entry number from the statistics information table 70 upon receiving the delete instruction from the flow entry management unit 44, transfers the contents to the flow information storage 52, and deletes the statistics information entry.

The flow information storage 52 stores therein the flow identification condition received from the flow table searching unit 42 and the statistics information received from the statistics information processing unit 47. These two types of information will be hereinafter referred to as the flow information. At the time at which the flow information corresponding to the preliminarily specified number of flows is stored in the flow information storage 52, the statistics information notification packet generation unit 53 reads out the stored flow information from the flow information storage 52 and generates a statistics information notification packet 300 by using the encapsulation header information shown by the statistics information notification packet header storage 50. The statistics information notification packet generation unit 53 outputs the generated statistics information notification packet 300 to the signal line L53, while outputting the packet reception notification to the signal line L530.

Figures 25, 26:
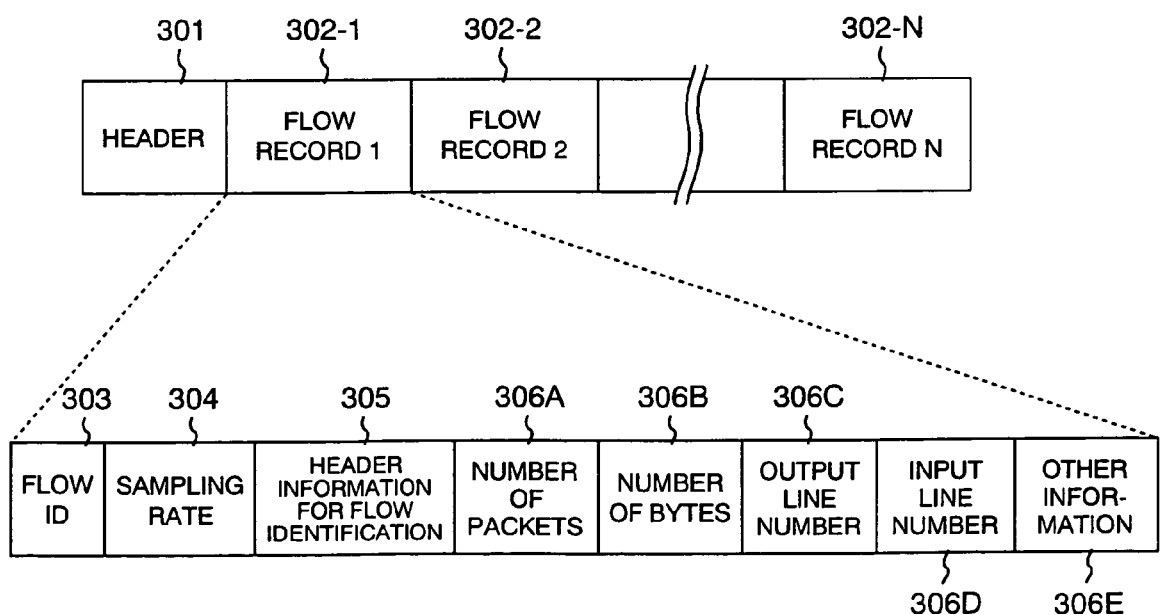
FIG. 25 is a view showing an example of the flow management table 49 of FIG. 20.
FIG. 26 is a view showing a format for a statistics information notification packet 300 outputted from the statistics information notification packet generation unit 53 of FIG. 20.

As shown in, e.g., FIG. 26, the statistics information notification packet 300 is composed of a header 301 and a plurality of flow records 302 (302-1 to 302-N). The header 301 is generated based on the encapsulation header information read out from the header storage 50 and includes the IP address of the collector apparatus C 1 as the destination IP address. For the statistics information notification packet 300, a format described in, e.g., a publication entitled "NetFlow Export Datagram Format", Cisco Systems can be applied.

In the example shown here, each of the flow records 302 includes a flow identifier 303, a sampling rate 304, a flow identification header information 305, the number 306A of packets, the number 306B of bytes, an output line number 306C, an input line number 306D, and other information 306E. To the information items 306A to 306E, statistics information outputted from the statistics information processing unit 47 is set. As the flow identifier 303, the flow entry number 61 is applied. As the sampling rate 304, a specified sampling rate used for the statistics control information is applied. As the flow identification header information 305, the flow identification condition 62 is applied. Upon receiving the statistics information notification packet described above, the collector apparatus C1 can estimate the number of packets actually communicated over the network from the sampling rate 304 shown by each of the flow records.

The statistics information notification packet 300 output from the statistics information notification packet generation unit 53 to the signal line L53 is stored temporarily in the buffer memory 22-(N+1) of the received packet processing unit 20. The packet reception notification output to the signal line L530 is input to the packet storing controller 23. This allows the packet storing controller 23 to process the statistics information notification packet 300 stored in the buffer memory 22-(N+1) in the same manner as normal received packets stored in the other buffer memories 22-1 to 22-N are processed.

In the same manner as when a packet received from the network is processed, after reading out the statistics information notification packet 300 from the buffer memory 22-(N+1), the packet storing controller 23 generates the internal header 15, requests the required number of memory block addresses of the memory status management unit 26, stores the internal header 15 and the header 301 in the form of the first packet data management information block in the input packet header storage 25A, divides the data portion (flow records 302-1 to 302-N) of the statistics information notification packet 300 into a plurality of blocks each having a fixed length, stores the plurality of blocks in the packet data storage 24, as illustrated with reference to FIG. 18, and outputs a packet reception notification to the header transmission controller 27.

The operation of each of the header transmission controller 27 and the searching unit 40 is the same as when a normally received packet is processed. The header information of the notification packet 300 is processed in the same manner as the header information of a packet received from the network. As a result, the statistics information notification packet 300 is transferred, with the internal header including the output line number 152 specified by the result of searching the routing table being added thereto, to the transmission packet processing unit 30 and sent out from the transmission packet processing unit 30 to a line connected to the collector apparatus C1.

A description will be given next to the operation of the searching unit 40 when the packet storing controller 23 processes a packet which does not match the flow identification condition shown by the entry EN-x12 for flow registration, e.g., a packet belonging to the flow 3 or flow 4 using UDP for the higher layer protocol having been described by referring to FIG. 1.

The routing table searching unit 43 searches the routing table 80 in accordance with the header information received from the header information storage unit 41 and outputs the result of searching. On the other hand, the flow table searching unit 42 generates a flow searching key from the header information and also, if necessary, from the routing information found as a result of searching the routing table 80 and searches the flow table 60.

In this example, the higher layer protocol of the received packet is UDP so that entries (the statistics control entry and the flow entry) corresponding to the searching key do not exist at all in the flow table 60. Consequently, the flow table searching unit 42 outputs the result of searching indicative of the absence of the corresponding statistic control information to each of the flow entry management unit 44, the sample control unit 45, the sampling determination unit 46, and the statistics information processing unit 47.

When the statistics control information is absent, the flow entry management unit 44 does not perform flow registration. Each of the sample control unit 45, the sampling determination unit 46, and the statistics information processing unit 47 does not perform an operation specific thereto, either. Accordingly, the searching result output unit 48 generates the searching result notification 480 in which each of the copy flag 482 and the encapsulation indication flag 483 is "0", the encapsulation header information 484 is invalid, and only the output line number 481 and the other information 485 include valid information and outputs the generated searching result notification 480 to the signal line L48. The operation of the received packet processing unit 20 executed in responses to the searching result notification 480 is the same as in the case of the received packet belonging to the flow 1.

A description will be given next to the sampling-type statistics information collecting function provided in the router R1 according to the present embodiment. Here, the sample control unit 45 and the sampling determination unit 46 detect a packet flow in a special communication state by using the statistics control information registered in the flow table 60 and the statistics information stored in the statistics information table 70 and instructs the received packet processing unit 20 to generate a copy of the received packet with a timing specified by the sampling rate.

For example, the case is assumed here where, in the network shown in FIG. 1, the terminals T2 and T4 transmits SYN packets in accordance with the TCP (Transmission Control Protocol) to the server S2, thereby to disturb (SYN attack) communication services from the server S2 to the other terminals. In the SYN attack packet, the SYN flag of the code bits defined in the TCP header has been set to "1".

In the following description, a series of SYN packets transmitted from the terminal T2 to the server S2 will be termed a flow Fs2 and a series of SYN packets transmitted from the terminal T4 to the server S2 will be termed a flow Fs4. It is also assumed that the total bandwidth of the SYN packets transmitted from the terminals T2 and T4 increases with the passage of time. The present embodiment will describe the case where the searching unit 40 starts the generation of a sample (copy packet) of the received packet at the sampling rate 1/10 when the total bandwidth of the TCP SYN packets becomes 50 Mbps or more and stops the generation of the sample when the total bandwidth decreases to 40 Mbps or less.

FIG. 27 shows an example of the flow table 60 for detecting the SYN attack. In the flow table 60, an entry EN-x24 having a flow entry number f24 has been registered to monitor the TCP SYN packets to sample them. The entry EN-x24 is also one of the statistics control entries and has specified "TCP" for the higher layer protocol 623, "1" for the SYN flag 627, and an arbitrary value ("*") for each of the other items 621, 622, 624 to 626, and 629 as the flow identification condition 62.

In the statistics control information 63 to be outputted as a result of searching, the entry EN-x24 has specified "0" for the registration flag, "1" for the statistics collection flag "1", "0" for the sampling flag, "1/10" for the sampling rate, "1" for the sampling determination flag, "50 Mbps" for the sampling-start bandwidth, and "40 Mbps" for the sampling-end bandwidth.

FIG. 28 shows an example of the contents of the statistics information entry SE-x24 having the flow entry number f24 prepared in the statistic information table 70. The statistics information at the current time is such that, e.g., the number 721 of packets is "P24", the number 722 of bytes is "B24", and the bandwidth 735 is "10 Mbps".

The operation in this case is the same as the case where the received packet belonging to the flow 1 is processed until the routing table searching unit 43 and flow table searching unit 42 execute respective table searching in the searching unit 40 after the packet storing controller 23 of the received packet processing unit 20 reads out a received packet (SYN packet) from any of the buffer memories and the header transmission controller 27 transfers the header information of the received packet to the searching unit 40.

When the received packet is the SYN packet belonging to the flow Fs2, the searching key generated by the flow table searching unit 42 from the header information matches the flow identification condition of the entry EN-x24 shown in FIG. 27. Accordingly, the flow table searching unit 42 distributes, as a result of searching, the statistics control information shown by the entry EN-x24 to the flow entry management unit 44, the sample control unit 45, the sampling determination unit 46, and the statistics information processing unit 47.

This time, each of the registration flag 631 and the sampling flag 635 in the statistics control information found as a result of searching is "0" so that each of the flow entry management unit 44 and the sample control unit 45 does not perform a special response operation. Since the statistics collection flag 633 of the statistics control information is "1", the statistics information processing unit 47 updates the statistics information 72 of the entry SE-x24 having the flow entry number f24. Accordingly, the respective values of the number 721 of packets, the number 722 of bytes, and the bandwidth 725 become larger than those shown in FIG. 28.

On the other hand, the sampling determination unit 46 executes a determination (sampling start determination) on whether the sampling of the received packet should be started because the sampling determination flag 635 is "1" and the sampling flag 635 is "0" in the statistics control information. The sampling start determination denotes that the statistics information having the flow entry number f24 is requested of the statistics information processing unit 47 and a comparison is made between a current bandwidth 735 and the sampling-start bandwidth 638 shown by the statistics control information. Since the current value "10 Mbps" of the bandwidth 735 is smaller than the value "50 Mbps" specified in the sampling-start bandwidth 638, the sampling determination unit 46 judges that sampling is unnecessary and does not perform a special operation. At this time, therefore, the searching result output unit 48 outputs a searching result notification 480 in which each of the copy flag 482 and the encapsulation indication flag 483 is "0" and the output line number 481 and the other information 485 include valid information. This time, no sample packet is generated in the received packet processing unit 20.

It is assumed that the operation described above is repeated and the value of the bandwidth 735 of the flow entry EN-24 has progressively increased to "51 Mbps". In this state, when the packet storing controller 23 processes the SYN packet belonging to the flow Fs2 and the header transmission controller 27 transfers the header information to the searching unit 40, the sampling determination unit 46 executes the sampling start determination on the flow having the flow entry number f24 and detects that the current bandwidth 735 has exceeded the sampling-start bandwidth 638 specified in the statistics control information. This time, the sampling determination unit 46 judges that sampling should be started and instructs the flow table searching unit 42 to rewrite the sampling flag 635 to "1" in the flow entry EN-x24 having the flow entry number f24. In response to the instruction, the flow table searching unit 42 rewrites the value of the sampling flag 635 in the statistics control information of the flow entry EN-x24 to "1".

Up to this time point, only the statistics information 72 of the entry SE-24 in the statistics information table 70 and the statistics control information of the flow entry EN-24 in the flow table have been updated and the operation of the sample control unit 45 remains unchanged. Accordingly, the searching result output unit 48 outputs the searching result notification 480 as before to the signal line L48 and no sample packet is generated in the received packet processing unit 20.

However, if a next SYN packet belonging to the flow Fs2 is received after the value of the sampling flag 635 was rewritten to "1", the operation of the searching unit 40 changes. Since each of the sampling determination flag 637 and the sampling flag 635 is "1" in the statistics control information notified from the flow table searching unit 42, the sampling determination unit 46 executes sampling end determination on whether the sampling of the received packet should be ended for the flow with the flow entry number f24. The sampling end determination denotes that the statistics information with the flow entry number f24 is requested of the statistics information processing unit 47 and a comparison is made between the current bandwidth 735 and the sampling-end bandwidth 639. Since the current bandwidth 735 has exceeded the sampling-end band width 639 herein, the sampling determination unit 46 judges that the rewriting of the sampling flag is unnecessary and waits for the next statistics control information.

On the other hand, the sample control unit 45 generates a sampled packet generation instruction (copy instruction) with a frequency in accordance with the sampling rate 636 by using, e.g., a packet counter because the sampling flag 635 is "1" in the statistics control information notified from the flow table searching unit 42. In this example, the sample control unit 45 generates the copy instruction at a rate of one instruction to ten SYN packets and gives the copy instruction to the searching result output unit 48 via the signal line L45. The operation of the searching result output unit 48 in a cycle in which the copy instruction is not generated is the same as in the case described above where the sampling flag 635 is "0".

Upon receiving the copy instruction from the signal line L45, the searching result output unit 48 generates a first searching result notification for notifying the received packet processing unit 20 that the generation of the packet copy becomes necessary, outputs the first searching result notification to the signal line L48. After that, the sampling result output unit 48 generates a second searching result notification for notifying the received packet processing unit 20 that a copy packet encapsulated by using the encapsulation header information should be transmitted to the collector apparatus, and outputs the second searching result notification to the signal line L48.

The first searching result notification is generated in the same manner as the normal searching result notification 480 and the copy indication flag 482 is set to "1". Specifically, "0" is set to the encapsulation indication flag 483 and the output line number and the other information each extracted from the result of searching the routing table are set to the output line number 481 and the other information 485, while the encapsulation header information 484 is invalid.

In the second searching result notification, "0" is set to the copy indication flag 482, "1" is set to the encapsulation indication flag 483, and encapsulation header information for transmitting a sample (a copy of the received packet) to the collector apparatus is set to the encapsulation header information 484. The encapsulation header information is read out from the sample packet header storage 51. To the output line number 481 and the other information 485 in the second searching result notification, the output line number and the other information each prepared in advance in the sample packet header storage 51 are set, respectively.

In FIG. 16, upon receiving the first searching result notification 480 mentioned above, the header transmission controller 27 of the received packet processing unit 20 sets the items from the output line number 481 to the encapsulation header information 484 shown by the searching result notification to the internal header 15 of the first packet data management information block 200-1, in the same manner as when the normal packet is processed, and writes the first packet data management information block 200-1 in the output packet header storage 25B. Since the copy indication flag 482 is "1" in the searching result notification received this time, the header transmission controller 27 holds the first packet data management information block 200-1 that has already been written in the output packet header storage 25B without discarding it. When the following packet data management information blocks 200-2, 200-3, . . . exist, these packet data management information blocks are written as they are in the output packet header storage 25B and held without being discarded, similarly to the first packet data management information block 200-1.

Thereafter, the header transmission controller 27 notifies the copy management unit 28 of the number of copies and the value of the memory address 204 shown by each of the packet data management information blocks and requests the packet transfer controller 29 to start packet transfer. This time, the copy indication flag 482 in the searching result notification is "1" so that the copy management unit 28 is notified of "1" as the number of copies. Consequently, the copy management unit 28 sets the number of times 282 of transmission wait of the memory block 281 corresponding to the memory address notified from the header transmission controller 27 to "2" in the address release control table 280 shown in FIG. 24.

In response to the packet transfer start request, the packet transfer controller 29 reads out the packet data management information blocks 200-1, 200-2, . . . from the output packet header storage 25B, reads out the packet data portion from the packet data storage 24 based on these packet data management information blocks, and outputs a reconstructed internal packet (SYN packet) to the signal line L1.

When the packet transfer controller 29 completes the transfer of the internal packet, the copy management unit 28 reduces the number of times of transmission wait of each of the memory blocks for which data transmission has been completed by 1 in the address release control table 280. This time, since the initial value of the number of times of transmission wait of each of the memory blocks for which data transmission has been completed has been set to "2", "1" is left as the number of times of transmission wait after the reduction. Accordingly, the issue of the address release notification to the memory status management unit 26 is suppressed for these memory blocks and the packet data stored in the packet data storage 24 are preserved as they are.

Following the first searching result notification, the header transmission controller 27 receives the second searching result notification from the searching result output unit 48. Upon receiving the second searching result notification, the header transmission controller 27 sets the items from the output line number 481 to the encapsulation header information 484 each shown by the searching result notification into the internal header 15 of the first packet data management information block 200-1 in the same manner as on the reception of the first searching result notification and writes the first packet data management information block 200-1 in the output packet header storage 25B. When the following packet data management information blocks 200-2, 200-3, . . . exist, the header transmission controller 27 writes these packet data management information blocks as they are in the output packet header storage 25B. This time, the copy indication flag 482 is "0" in the second searching result notification so that the packet data management information blocks 200-1, 200-2, . . . that have already been written in the output packet header storage 25B are discarded.

Thereafter, the header transmission controller 27 notifies the copy management unit 28 of the number of copies and the value of the memory address 204 shown by each of the packet data management information blocks and requests the packet transfer controller 29 to start packet transfer. This time, since the copy indication flag 482 is "0", the copy management unit 28 sets the number of times 282 of transmission wait of the memory block 281 corresponding to the memory address notified from the header transmission controller 27 to "1" in the address release control table 280. When the transfer of the internal packet by the packet transfer controller 29 is completed, therefore, the number of times of transmission wait of each of the memory blocks for which data transmission has been completed becomes "0" after the reduction and the address release notification is issued to the memory status management unit 26.

In the internal packet which includes a copy of the SYN packet to be transferred from the packet transfer controller 29 to the transmission packet processing unit 30 in response to the second searching result notification, the encapsulation indication flag 153 of the internal header 15 has been set to "1". The packet output controller 32 of the transmission packet processing unit 30 extracts the internal header 15 included as a part of the header information 205 in the first packet data management information block 200-1 that has been read out from the output packet header storage 34 and checks the encapsulation indication flag 153. This time, the encapsulation indication flag 153 is "1" so that the packet output controller 32 imparts the encapsulation header information 154 (the layer 2 header to the layer 4 header) included in the internal header 15 and destined for the collector apparatus to the head of the copy packet and transmits the copy packet to the line termination unit 30-k specified by the output line number 152.

The generation of the copy packet and the transmission of the encapsulated packet to the collector apparatus C1 described above are repeatedly executed with a frequency in accordance with the sampling rate 636 until the bandwidth 725 of the SYN packet as a target of monitoring becomes lower than the sampling-end bandwidth 639 specified by the flow entry EN-24. When the amount of sending the SYN packets corresponding to the flow identification condition 62 decreases in the state that the sampling flag 635 of the flow entry EN-24 is set to "1", and the value of the bandwidth 775 in the statistics information table 70 becomes lower than "40 Mbps" specified by the sampling-end bandwidth 639, the searching unit 40 operates as follows.

When the packet storing controller 23 of the received packet processing unit 20 completes the storage of a new SYN packet and the header information of the SYN packet is transferred from the header transmission controller 27 to the header information storage 41 of the searching unit 40, the flow table searching unit 42 distributes the statistics control information 63 of the flow entry EN-24 obtained as a result of searching the flow table 60 to the flow entry management unit 44, the sample control unit 45, the sampling determination unit 46, and the statistics information processing unit 47.

The flow entry management unit 44 does not perform a specified response operation because the registration flag of the statistics control information 63 is "0". The statistics information processing unit 47 updates the statistics information 72 of the statistics information entry SE-x24 based on the header information received from the header information storage 41 because the statistics collection flag of the statistics control information 63 is "1". The sample control unit 45 repeats the copy instructing operation in accordance with the sampling rate 636 in the same manner as performed previously because the sampling flag 635 of the statistics control information 63 is "1".

On the other hand, the sampling determination unit 46 executes a sampling end determination for the flow with the flow entry number f24 because each of the sampling determination flag 637 and the sampling flag 635 in the statistics control information 63 is "1". This time, since the current bandwidth 735 becomes lower than the sampling-end bandwidth 639, the sampling determination unit 46 notifies the flow table searching unit 42 to rewrite the sampling flag 635 in the entry EN-24 with the flow entry number f24 to "0", and the flow table searching unit 42 returns the statistics control information 63 of the entry EN-24 to the initial state. Accordingly, there is no copy instruction from the sample control unit 45 during the processing of the SYN packet until the bandwidth of the SYN packet flow exceeds the sampling-start bandwidth again and the sampling flag 635 is set to "1" so that the transmission of the encapsulated packet to the collector apparatus C1 is brought into a halt state.

By specifies, e.g., the respective values of the TCP flag, the destination/source MAC address of the Ethernet header, and the VLAN ID as the other information 629 in the flow identification condition, the present invention enables the detection of a Denial of Service attack (DOS attack) to the server using a specified control packet in a TCP connection and the individual collection of statistics information for each of the VLAN-ID and the MAC addresses.

Although the packet storage controller 23 has generated the internal header 15 to be imparted to each of the received packets, sets the internal header 15 to the packet data management information block 200, and stores the packet data management information block 200 in the input packet header storage 25A in the embodiment, it is also possible to generate the internal header in each of the line termination units 21-1 to 21-N such that the packet storage controller 23 reads out the received packet in the form of an internal packet from each of the buffer memories 22-1 to 22-N. In this case, since it is necessary to impart the internal header 15 even to the statistics information notification packet 300 stored in the buffer memory 22-(N+1), the internal header 15 may be prepared appropriately in advance in the statistics information notification packet header storage 50.

Although the embodiment has described the example in which a new flow entry is added unconditionally to the flow table 60 when the statistics control entry EN-x12 for flow registration is found as a result of searching, it is also possible to specify a condition for the registration of a new flow entry by the statistics control information 63 of the statistics control entry EN-x12 so that a new entry is added to the flow table 60 when the condition is satisfied.

For example, if it is promised that the sampling-start bandwidth 638 indicates a condition for starting sampling when the sampling determination flag 637 is "1" in the entry EN-x12 or indicates a condition for starting the registration of a new entry when the sampling determination flag 637 is "0" and the registration flag 631 is "1" in the entry EN-x12, it becomes possible to cause the flow entry management unit 44 to start the operation of adding a new entry to the flow table 60 when the registration start bandwidth is satisfied in a TCP low, by setting each of the registration flag 631, the statistics collection flag 633, and a bandwidth calculation flag 634 to "1" and setting the sampling determination flag 637 to "0" in the statistics control information of the statistics control entry EN-x12.

What is claimed is:

1. A communication statistic information collection apparatus comprising:
   a flow table composed of a plurality of flow entries each defining a flow identification condition for identifying a packet flow;
   a statistics information table composed of a plurality of statistics information entries each storing statistics information of a plurality of information items;
   a searching unit for searching, by using a combination of a plurality of header information items extracted from a header of each of packets received from a network as a flow searching key, said flow table for a flow entry having the flow identification condition corresponding to the flow searching key, collecting statistics information individually for each of the packet flows, and updating the statistics information stored in one of said statistics information entries corresponding to the searched flow entry; and
   a statistics function control table including a plurality of statistics control entries previously registered in the table, each of the statistic control entries defining, in association with the flow identification condition, statistics control information for limiting the packets for which the statistics information is to be collected, wherein
   said searching unit executes searching said flow table in accordance with the flow searching key generated from the header information of each of the received packets, collecting, when the flow entry corresponding to the flow searching key is found from the flow table, the statistics information of a packet flow to update the statistics information stored in one of said statistics information entries corresponding to the searched flow entry, searching said statistics function control table when there is no flow entry corresponding to the flow searching key, collecting, when a statistics control entry corresponding to the flow searching key is found from the statistics function control table, the statistics information of a packet flow corresponding to the flow identification condition of the statistics control entry in accordance with the statistics control information shown by the statistics control entry, and updating the statistics information stored in one of said statistics information entries corresponding to the searched statistics control entry, said statistics function control table includes first and second statistics control entries each of which specifies, as the flow identification condition, a header information value of at least one of the plurality of header information items serving as the flow searching key, the statistics control information of said first statistics control entry indicates to add a new flow entry to said flow table to collect the statistics information for each of the packet flows identified by the flow searching key, and the statistics control information of said second statistics control entry indicates to generate of a copy of each of the received packets in the packet flow corresponding to the flow identification condition at a specified sampling rate, said searching unit comprises first means for adding a new flow entry having said flow searching key as the flow identification condition to said flow table when said first statistics control entry is found as corresponding to the flow searching key from said statistics function control table, and second means for starting a control operation for generating the copy of the received packet corresponding to the flow identification condition at the specified sampling rate and transferring the copy packet to another communication statistics information collection apparatus as preliminarily specified when said second statistics control entry is found as corresponding to the flow searching key from said statistics function control table, said second statistics control entry includes, as a part of the statistics control information, a condition for starting sampling to transfer a copy of the received packet generated at said specified sampling rate to said preliminarily specified statistics information collection apparatus and a sampling flag indicative of whether the sampling should be executed, and a second means of said searching unit comprises:

a sampling determination unit for comparing, when said second statistics control entry is found as the statistics control entry corresponding to the flow searching key from said statistics function control table and the sampling flag is in an OFF state, the condition for starting said sampling with the statistics information shown by the statistics information entry corresponding to the second statistics control entry and changing said sampling flag to an ON state when the condition for starting the sampling is satisfied; and a sampling unit for generating a control signal to generate the copy of the received packet at the specified sampling rate when the sampling flag is in the ON state.

2. The communication statistic information collection apparatus according to claim 1, wherein said second statistics control entry includes, as a part of the statistics control information, a condition for ending the sampling, and said sampling determination unit compares, when the second control entry is found as a result of searching said statistics function control table and the sampling flag is in the ON state, the condition for ending said sampling with the statistics information shown by the statistics information entry corresponding to the second control entry and returns said sampling, flag to the OFF state when the condition for ending the sampling is satisfied.

* * * * *